(12) United States Patent
Schwarzkopf et al.

(10) Patent No.: US 9,986,313 B2
(45) Date of Patent: May 29, 2018

(54) SYSTEMS AND METHODS FOR PROVIDING ENVIRONMENTAL MONITORING AND RESPONSE MEASURES IN CONNECTION WITH REMOTE SITES

(71) Applicant: PILLAR TECHNOLOGIES, INC., Boston, MA (US)

(72) Inventors: Alexander Messersmith Schwarzkopf, Boston, MA (US); Matthew Jean-Marie Joseph Joyal, Cumberland, RI (US); Sean Iacobone, Westminster, MA (US)

(73) Assignee: PILLAR TECHNOLOGIES, INC., Westminster, MA (US)

( * ) Notice: Subject to any disclaimer, the term of this patent is extended or adjusted under 35 U.S.C. 154(b) by 0 days. days.

(21) Appl. No.: 15/349,811

(22) Filed: Nov. 11, 2016

(65) Prior Publication Data

US 2017/0180829 A1    Jun. 22, 2017

Related U.S. Application Data

(60) Provisional application No. 62/268,260, filed on Dec. 16, 2015.

(51) Int. Cl.
*H04Q 9/00* (2006.01)

(52) U.S. Cl.
CPC ........... *H04Q 9/00* (2013.01); *H04Q 2209/00* (2013.01); *H04Q 2209/10* (2013.01); *H04Q 2209/40* (2013.01)

(58) Field of Classification Search
CPC ........... H04Q 2209/00; H04Q 2209/10; H04Q 2209/40; H04Q 2209/70; H04Q 2209/80; H04Q 2209/84; H04Q 9/00
See application file for complete search history.

(56) References Cited

U.S. PATENT DOCUMENTS 6,959,331 B1   10/2005   Traversat et al.
9,220,050 B2   12/2015   Kelsey et al.
(Continued)

FOREIGN PATENT DOCUMENTS

JP   WO 2015115663 A1 *   8/2015   ................ H02J 3/14

OTHER PUBLICATIONS

International Search Report and Written Opinion for International Application No. PCT/US2016/061646 dated Mar. 7, 2017.

*Primary Examiner* — Hai Phan
*Assistant Examiner* — Franklin Balseca
(74) *Attorney, Agent, or Firm* — Lando & Anastasi, LLP

(57) ABSTRACT

A monitoring and response system is provided for monitoring and responding to environmental conditions at one or more sites. The monitoring system includes a plurality of base units, each base unit including at least a processor and a plurality of sensors configured to monitor environmental conditions at the site(s). A central controller is in communication with the base processors at the plurality of base units and is configured to receive and process sensor information from the base units. Base units are configured to be modular and contain customizable, swappable combinations of sensors, sensor arrays, and/or other connected peripherals, and are further configured to be mountable and/or attachable to a wide variety of surfaces and objects disposed around a site such as a construction site. The system further comprises a backend, analytic system for making predictions, taking action, and generating reports responsive to the information received from the base units.

80 Claims, 28 Drawing Sheets

(56) References Cited

U.S. PATENT DOCUMENTS

| | | | |
|---|---|---|---|
| 9,297,748 B2* | 3/2016 | Risk | G01N 21/3504 |
| 9,445,216 B2* | 9/2016 | Kim | H04W 4/005 |
| 2007/0282665 A1* | 12/2007 | Buehler | G06Q 30/02 |
| | | | 705/7.29 |
| 2008/0017790 A1* | 1/2008 | Boyle | G01N 27/624 |
| | | | 250/287 |
| 2011/0055154 A1 | 3/2011 | Gantaume et al. | |
| 2011/0254680 A1 | 10/2011 | Perkinson et al. | |
| 2012/0229296 A1 | 9/2012 | Ree | |
| 2014/0278144 A1 | 9/2014 | Risk et al. | |
| 2015/0318015 A1 | 11/2015 | Bose et al. | |
| 2016/0018226 A1* | 1/2016 | Plocher | A62B 3/00 |
| | | | 701/428 |
| 2016/0149777 A1* | 5/2016 | Kim | H04L 43/0876 |
| | | | 709/224 |
| 2016/0173367 A1 | 6/2016 | Sareen et al. | |
| 2016/0359325 A1* | 12/2016 | Kawata | H02J 3/14 |

* cited by examiner

SYSTEMS AND METHODS FOR PROVIDING ENVIRONMENTAL MONITORING AND RESPONSE MEASURES IN CONNECTION WITH REMOTE SITES

CROSS-REFERENCE TO RELATED APPLICATION

This application claims priority under 35 U.S.C. § 119(e) to U.S. Provisional Application Ser. No. 62/268,260 titled "SYSTEMS AND METHODS FOR PROVIDING RISK MANAGEMENT, MONITORING AND ALARM SYSTEMS IN CONNECTION WITH REMOTE SITES," filed Dec. 16, 2015, which is incorporated herein by reference in its entirety for all purposes.

BACKGROUND OF THE INVENTION

Field of the Invention

Aspects and embodiments disclosed herein relate generally to environmental monitoring and response systems and methods to be used in remote locations for enhancing operations management capabilities.

Discussion of Related Art

Currently, most monitoring solutions used in construction environments are manual. Monitoring for conditions of concern is typically performed either by observation or by use of handheld sensors with minimal logging features outside of manually recording the data. The use of the measurement methods is sporadic and the repeatability of these measurements cannot be confirmed. This data also holds little to no value to insurance companies in the case of an accident claim. For periods of time, for example, after work hours, a site may be left without any method of data measurement or monitoring. Wireless, stationary unit systems exist to measure specific variables, for example, dust particulate and dangerous gasses; however, these systems are not integrated into a seamless solution for site monitoring. Often, these systems do not provide real-time or near real-time data and do not offer immediate or near immediate alerts of ongoing conditions.

Construction companies have an interest in monitoring the environmental conditions of their worksite to reduce the occurrence of undesired conditions that are costly and lead to delays in the construction work timeline. For this reason, construction companies are moving to digitize the job site by integrating new technologies into their work routines. Some construction company personnel now use mobile devices, for example, handheld tablets or smartphones, allowing site drawing updates to be pushed to the hands of the user in real-time. This monitoring solution is designed to integrate into the currently existing use of digital solutions already being implemented on a site.

Constructions companies are further interested in streamlining compliance with regulatory agencies, maximizing attractiveness to employees and labor groups, and minimizing insurance premiums by demonstrating a greater capacity for risk mitigation. The fragmented and ad hoc nature of current monitoring solutions does not provide sufficient benefits to construction companies in these areas and stands to be improved.

There remains a need for an improved and more reliable system for monitoring and providing risk management of a remote site, for example, a construction site.

SUMMARY

Aspects and embodiments disclosed herein are generally directed to systems and methods for monitoring for and responding to one or more potential events of concern predicted or detected by monitoring environmental parameters using a network of portable base units each packed with various combinations of environmental sensors.

In accordance with one aspect, there is provided a monitoring and response system for monitoring and responding to environmental conditions at one or more sites. The monitoring system includes a plurality of base units, each base unit including a plurality of sensors and a base processor. The plurality of sensors are configured to monitor environmental conditions at the at least one remote site. A central controller is in communication with the base processors at the plurality of base units and is configured to receive sensor information from the plurality of sensors at each of the plurality of base units. The central controller may be housed remotely on an external server or locally on a base unit configured to function as the central controller depending on the desired or available network configuration.

The system further includes an analytic system and related software platforms for processing and analyzing the sensor information from a plurality of sensors at each of the plurality of base units. The software platforms are configured to perform analytics on data sourced from base units containing the plurality of sensors, databases stored in memory, third-parties, and other source of data relevant to the site or sites being monitored. The system may further include a plurality of external sensor units, sensor arrays, and other peripheral devices which communicate with base units and enhance the functionality of the monitoring and response system. The system may also take action responsive to the information gathered, for example, the system may actuate, deactivate, or otherwise control the operation of one or more pieces of equipment disposed on the site including alarms, jackhammers, lights, fans, valves, computers, cameras, intercoms, base units, sensors, sensor arrays, and more.

In accordance with various aspects, base units are configured to be modular and contain customizable, swappable combinations of sensors, sensor arrays, and/or other connected peripherals. Base units are further configured to be removably mountable and/or attachable to a wide variety of surfaces and objects disposed around a site such as a construction site. The modularity and mobility of said base units allows the attached sensors to be flexibly chosen and dispersed in accordance with the particular monitoring needs of the site or sites at issue.

The base units, external sensors, external sensor arrays, external peripherals, gateways, routers, and/or any other system components are intended to be disposed temporarily on a site and subsequently removed at a later time without causing significant damage to the site or any fixtures thereon. For example, the on-site components of the system may be installed at a construction site throughout construction and be removed following completion of construction activities.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
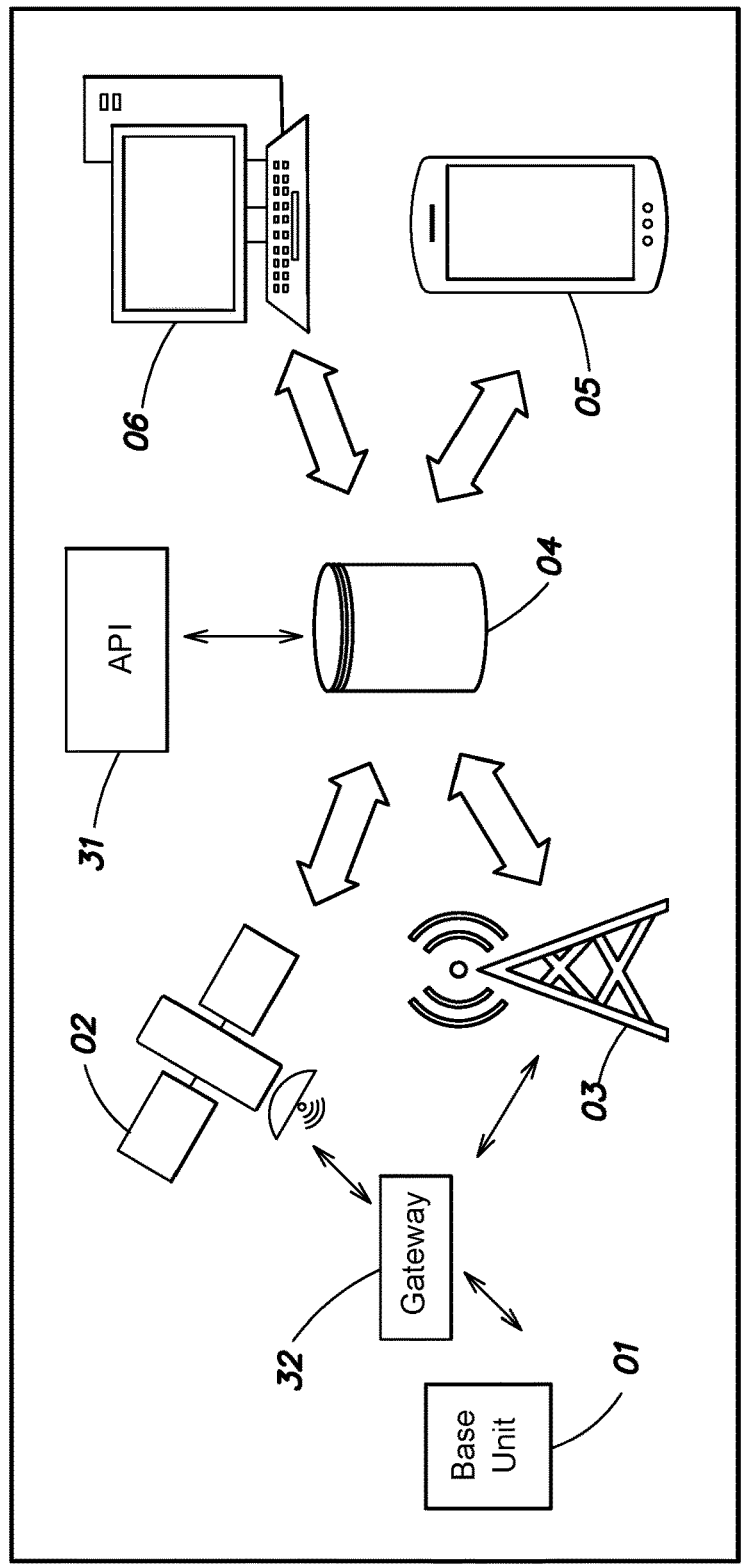
FIG. 1A shows an illustrative diagrammatic view of an embodiment of a system network.

In accordance with various aspects and embodiments, there is provided a monitoring solution having an intelligent communication interface. The monitoring solution may provide real-time, continuous measurements of environmental conditions to a nearby or remote location external to the monitoring equipment. A plurality of sensors may measure environmental conditions. Measured data may be converted to digital data and transmitted wirelessly or through a wired connection to a software platform capable of generating quantifiable metrics a user can act upon. Users may use this data to track, trend, and predict potential points of liability at a desired location using the monitoring solution. Locations for use of this system include but are not limited to construction sites, oil rigs or refineries, mining sites, industrial settings, and renovation work sites.

Aspects and embodiments disclosed herein relate to an environmental monitoring and risk mitigation system for a structure or a location of industrial activity. The system can generate alerts to inform a user of existing conditions, events, and/or damage. The system can generate warnings to assist the user in the prevention of site damage and/or to adhere to assumed or specified requirements. Data from different sensors can be paired together to provide more accurate readings and/or more actionable data than possible by using sensors individually. In some embodiments, groups of data each representing different parameters may be similarly combined to provide more accurate readings and/or more actionable data even if one or more groups of data is collected from the same sensor or sensor group. Analysis performed by a software platform included in the system can recognize trends in sensor data to produce predictions regarding future event occurrences. Analysis performed by the software platform can recognize trends to create suggestions on building performance, maintenance, climate control, air quality, and/or construction techniques. The system can aid the user in making quick, informed decisions and/or reduce liability. Report generation will display sourced data to highlight patterns or trends identified over time with use.

The following description is merely exemplary in nature and is not intended to limit the present disclosure, application, or uses. It should be understood that, throughout the drawings, corresponding reference numerals indicate like or corresponding parts and features.

Figure 2:
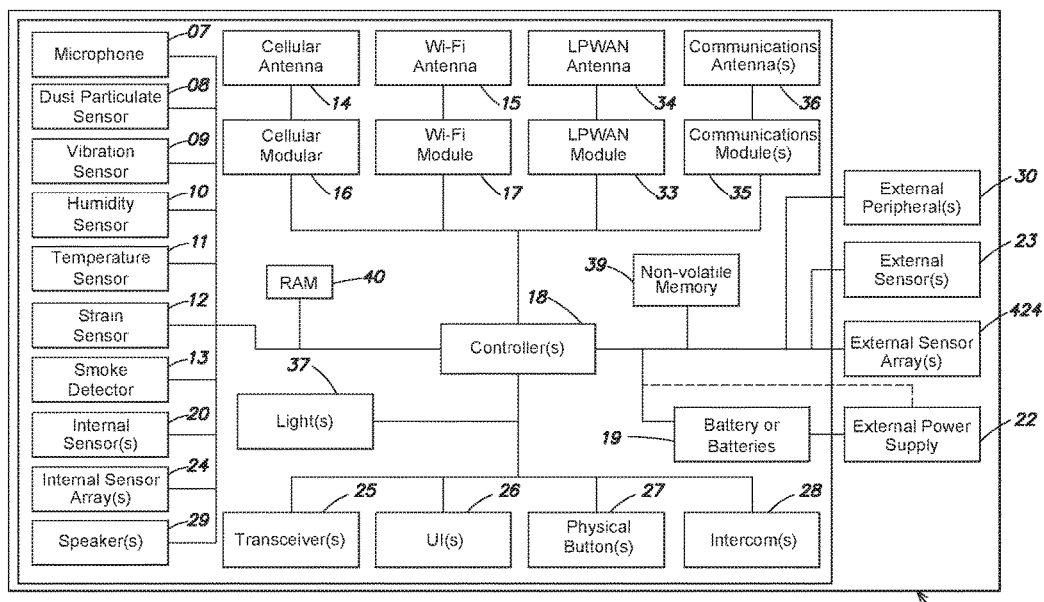
FIG. 2 shows an illustrative diagrammatic view of a block diagram of components of an embodiment of a base unit.

FIG. 1A is a diagram of a monitoring system in accordance with an illustrative aspect of the present invention. Portable base unit(s) 01 communicate information, for example, sensor conditions and/or alarm conditions, via wireless communications 02, 03 with server(s) 04 and can be wirelessly re-programmed using over the air programming methods initiated by the server(s) 04. The wireless communication used may illustratively be low-power wide-area network (LPWAN) 33 (as shown in FIG. 2), satellite 02, and/or cellular 03. It should be understood that while the following description references satellite 02, cellular 03, and LPWAN 33, other wireless communication protocols, frequencies, or frequency bands may also or alternatively be used, for example, low frequency (LF), very high frequency (VHF), ultra high frequency (UHF), or 802.11 (and similar communications). A user can interface with one or more servers 04 via a phone 05 or the internet 06 to manage the monitoring system (e.g., configure it and/or to receive information from the monitoring system, for example, sensor conditions, stored data, warnings, alarms, trends, predictions, system health or means to improve site efficiency). The one or more servers 04 will contain and/or execute various software packages that comprise much of the "back-end" functionality of the present system.

Figure 1B:
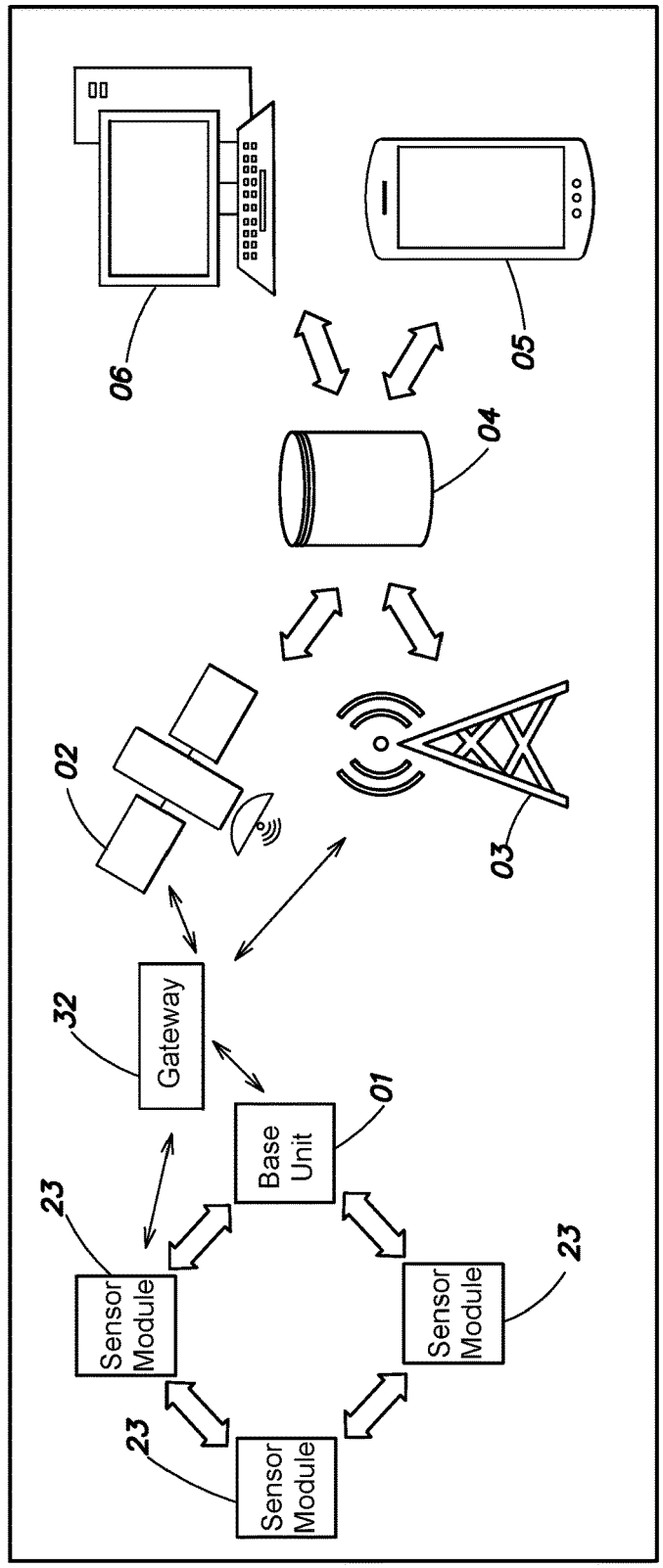
FIG. 1B shows an illustrative diagrammatic view of an embodiment of a system network including mesh network communication between a base unit and external sensor modules.

FIG. 1B depicts one embodiment of external sensor modules 23 connected via a mesh network to a base unit 01. A plurality of external sensor modules 23 and/or external sensor arrays 424 may communicate with one or more base unit(s) 01 using LPWAN, Bluetooth, ZigBee, LF, VHF, UHF, 802.11, Wi-Fi, satellite, cellular network, or other wireless or wired communication methods or protocols. External sensor modules 23 and/or external sensor arrays 424 may be located in close proximity to base unit(s) 01 and contain specific sensors or combination of sensors intended to monitor for specific conditions.

Responsive to analysis of input data sourced from base unit(s) 01, or due to input data generated by user via a phone 05 or internet 06 interface, one or more software platforms each running on one or more servers 04 may wirelessly communicate a command to one or more base unit(s) 01 to perform an action. Actions may be performed by base unit(s) 01 or by external sensor unit(s) 23 and/or external sensor arrays 424. Certain base unit(s) 01 or external sensor unit(s) 23 and/or external sensor arrays 424 may be hard wired or wirelessly connected to one or more other systems within the site (e.g., an HVAC system, window fans, temporary heating solutions, humidifiers, dehumidifiers, negative air pressure solutions, machinery, tools, jackhammers, fire sprinkler systems, etc.) and may have the capability of regulating and/or controlling the one or more other systems. Actions generated or performed by the software platform, base unit(s) 01, and external sensor unit(s) 23 and/or external sensor arrays 424 may result in the prevention or mitigation of damages to the site and on-site equipment, improvement of safety of on-site personnel, improvement of contractor logistics, reduction of timeline, or other improved efficiencies.

In some embodiments, the system may determine or be instructed to perform an action. For example, the system may detect an elevated level of moisture in one or more areas, zones, and/or sub-zones of a site being monitored. In some embodiments, the system may be configured to perform a first action or set of actions, for example, adjusting the position of one or more valves in one or more pipes to restrict the flow of water to said areas, zones, and/or sub-zones possessing the elevated level of moisture. In certain embodiments, the system may first check that this behavior will not have undesired consequences on one or more additional actions being performed or having the potential to be performed. For example, before adjusting the position of the one or more valves, the system may first check to make sure that a fire has not been detected in one or more of said areas, zones, and/or sub-zones, since altering the flow of water to one or more of those locations may allow the fire to spread and cause more damage than an event associated with the elevated level of moisture.

In some embodiments, the system may be configured to instruct workers or control machinery to suspend and/or initiate one or more actions in one or more zones or locations responsive to the analysis of input data. For example, the system may deactivate one or more sprinkler heads not proximate to a detected fire to avoid access water damage to the site. In another example, the system may reschedule time sensitive activity such as painting or pouring concrete responsive to detecting that the previous coat or layer is not sufficiently dry or that ambient conditions are not favorable.

For example, base unit(s) 01 or external sensor(s) 23 and/or external sensor arrays 424 may be connected to electrically motorized zone valve(s), which are connected in-line with the site's water supply. Software platform running on server 04 or controller 18 within base unit 01 may generate an alert and/or warning upon analysis of flow meter data and subsequently wirelessly communicate a command to base unit 01 to perform the action of activating the electrically motorized zone valve to turn ON or OFF the flow of water or restrict maximum flow allowing for prevention and mitigation of water damage.

Software platform running on server 04, or controller 18 within base unit 01, may generate an alert and/or warning upon analysis of temperature sensor(s) data and humidity sensor(s) data and subsequently wirelessly communicate command to base unit 01 to perform the action of activating site's HVAC system, site temporary heating/cooling system, and/or humidifier/dehumidifier systems which allows for prevention and mitigation of high humidity damage, low temperature damage, mold damage, or undesirable worker conditions.

Through the use of a built-in microphone on the base units 01, acoustic performance of an enclosed area can be measured to show how noise flows through a site. When a noise occurs, sound waves will propagate through a room and fixed surfaces, outward to any adjacent, open spaces. With a network of base units 01 throughout a site, the path that noise travels can be mapped by focusing on the amplitude of the noise measurements and the slight time delay that occurs as noise travels. Areas where noise penetrates with a higher amplitude relative to other areas may indicate weak acoustic locations due to flanking noise, HVAC ductwork, or other sources of acoustic weak points. Noise information may further be used for security purposes such detecting and/or tracking unauthorized activity, for example, detecting the presence of an intruder at the site and tracking their movements throughout.

Base unit(s) 01 may also be outfitted with one or more additional internal sensors 20, internal sensor arrays 24, and/or external sensor arrays 424. For example, UV sensors and/or light sensors combine data from these sensors with that from temperature 11 and/or humidity 10 sensors to monitor the amount of daylight a space in a site receives. Fluctuations in a room's environment may determine how sunlight or refracted light has an effect on the temperature, humidity, and environmental conditions of a room. By utilizing temperature and humidity measurements, the indoor dew point can be calculated and monitored. Dew point metrics will then be used for monitoring air quality and determining if water will condense on surfaces.

In some embodiments, an internal sensor 20, additional external sensor 23, and/or internal or external sensor array 24, 424 may include one or more infrared (IR) sensors and/or passive infrared (PIR) sensors. IR and PIR uses include, for example, detection of heat signatures for occupancy monitoring, and detection of heat signatures for fire detection and classification.

Data collected from base unit(s) 01 can also be utilized during environmental certification, for example, LEED or BREEAM. Information, for example, greenhouse gas emissions during construction can be monitored using CO, $CO_2$, methane sensors, or other applicable internal sensors 20, external sensor modules 23, and/or internal or external sensor arrays 24, 424. Minimum indoor air quality performance may be continually monitored using dust particulate sensors, smoke detecting sensors, and/or gas sensors. Criteria focusing on water metering, whether indoor, outdoor, or building-level can be subsequently handled through the use of electrically motorized zone valves and flow metering devices. Acoustic performance and daylight/interior lighting monitoring will be possible with onboard sensors previously highlighted.

Base unit(s) 01 or external sensor(s) 23 and/or external sensor arrays 424 may be connected to air pressure regulator(s). A software platform running on server 04, or controller 18 within base unit 01, may generate command(s) upon analysis of pressure sensor data and subsequently wirelessly (or over a wired connection) communicate a command to base unit 01 to perform the action of regulating the activity of the air pressure regulator allowing for adherence to negative air pressure regulations.

Base unit(s) 01 or external sensor(s) 23 and/or external sensor arrays 424 may be connected to on-site machinery and tools including but not limited to jackhammer(s) and pile driver(s) and/or sources of power or pneumatic pressure for same. A software platform running on server 04, or controller 18 within base unit 01, may generate an alert and/or warning upon analysis of accelerometer sensor or vibration sensor data indicating the presence of vibrations at undesirable frequencies or amplitudes and subsequently wirelessly (or over a wired connection) communicate a command to base unit 01 to perform the action of de-activating or changing a mode of operation of the on-site machinery and/or tools allowing for prevention and mitigation of structural damage, foundation cracking, and the like.

Base unit(s) 01 or external sensor(s) 23 and/or external sensor arrays 424 may be connected to a localized water sprinkler system that may be comprised of localized electrically motorized valve(s) or switch(es) which control the flow of water on a room by room basis, regional basis within a site, or sprinkler head basis. A software platform running on server 04, or controller 18 within base unit 01, may generate an alert and/or warning upon analysis of temperature sensor, smoke sensor, dust particulate sensor, oxygen sensor, $CO_2$ sensor, PIR sensor, humidity sensor, VOC sensor, pressure sensor, acoustic sensor, and/or accelerometer data indicating the presence or possibility of a fire and subsequently wirelessly (or over a wired connection) communicate a command to base unit 01 to perform the action of activating the electrically motorized valve or switch to turn ON or OFF the localized sprinkler system allowing for prevention and mitigation of fire damage and subsequent water damage. By controlling which sprinklers are activated, water dispersal and resulting water damage may be contained. System connection to the water sprinkler system may be embodied as an external sensor unit 23 which replaces an existing sprinkler head, or is inserted in-line with the sprinkler system between the piping and the sprinkler head.

In some embodiments, an external sensor 23, internal sensor 20, internal sensor array 24, and/or external sensor array 424 may comprise a power sensor or power meter connected to one or more power outlets disposed at the site being monitored. The power sensor may be in wireless or wired communication with one or more base units 01 or directly to server 04 and configured to measure an amount of power drawn from the one or more outlets being monitored. In certain embodiments, the power sensor may possess one or more power ports allowing power to be drawn from the site power outlets and relayed through the power meter before being provided to a connected load. By measuring the amount of power drawn from the one or more power outlets, the power sensor 20, 23 or array of power sensors 24, 424 can detect usage and various power events, for example, a power surge or outage. In further embodiments, power sensor may be configured to provide surge protection responsive to a detected power surge or otherwise limit usage based on factors such as received power pricing information.

In certain embodiments, a base unit 01, external sensor 23, external sensor array 424, external peripheral 30, and/or other connected site component may be communicatively coupled to one or more gateways and/or routers 32. A gateway and/or router 32 may function as an intermediary allowing one or two-way communication between the connected component(s) and a communications service or module such as satellite 02, cellular tower 03, server 04, additional gateway and/or router 32, and/or another communications service or module. In other embodiments, a base unit 01, external sensor 23, external sensor array 424, external peripheral 30, and/or other connected site component may be in direct communication with a communications service or module such as satellite 02, cellular tower 03, server 04, and/or another communications service or module without the use of a gateway as a communications intermediary. In some embodiments, one or more wireless repeaters may be positioned proximate to the one or more gateways 32 in order to extend the signal range of each of the one or more gateways. Server 04 may further be coupled to one or more application programming interfaces (APIs) 31 for building and/or managing the software executing on server 04.

FIG. 2 is a block diagram of one embodiment of a base unit 01. Base unit 01 includes one or more controllers 18 each coupled to one or more wired or wireless communication modules, for example, an LPWAN module 33, a cellular module 16, Wi-Fi module 17, satellite module, or any combination thereof, and a plurality of sensors including but not limited to one or more of a microphone 07, dust particulate sensor 08, vibration sensor 09, humidity sensor 10, temperature sensor 11, strain sensor 12, and smoke detector 13. Other types of internal sensors 20 or internal sensor arrays 24 may be similarly installed in a base unit 01 and may include water sensors, light sensors, radio frequency (RF) sensors, $CO_2$ sensors, CO sensors, oxygen sensors, hydrogen sulfide ($H_2S$) sensors, methane sensors, gyroscopic sensors, accelerometers, wind sensors, barometric sensors, infrared (IR) sensors, passive infrared (PIR) sensors, volatile organic compound (VOC) sensors, a compass, photodiode sensors, and/or magnetic sensors. Any combination of internal sensors 20 disclosed herein may also be installed as a group or array of sensors 424 within said base unit 01 or outside of said base unit as an external sensor array.

One or more external sensors 23 and/or external sensor arrays 424 that are not included in the standard base unit can be added as external modules, either through a wireless or wired connection, to measure additional conditions or events of interest on a per application basis. External sensors 23 and/or external sensor arrays 424 can comprise any of the internal sensor types 07-13, 20 and/or internal sensor array types 24 discussed herein and/or known to those in the art. For example, base unit sensors may include temperature sensors, humidity sensors, and dust particulate sensors. Carbon dioxide ($CO_2$), carbon monoxide (CO), and oxygen concentrations and levels may be of interest to monitor in a confined space on a job site, but not on the entire site. $CO_2$, CO, and oxygen sensors may thus be added as additional sensors in the form of a modular plugin to standard base units placed within the confined space. Similarly, any external sensor types 24 or external sensor array types 424 disclosed herein may similarly be configured to be internal sensors 20 or internal sensor arrays 24, respectively. Any combination of internal sensors 20 and/or external sensors 23 of the present disclosure may comprise an internal and/or external sensor array 24, 424.

Wired connections may provide for communications and power to the internal sensors 20, external sensor(s) 23, and/or sensor arrays 24, 424. Internal sensor(s) 20 can include other types of sensors, for example, water, light, radio frequency (RF), $CO_2$, CO, oxygen, hydrogen sulfide ($H_2S$), methane, gyroscopic, accelerometer, strain, wind, and/or barometric sensors or any of the sensor types mentioned herein with respect to both internal and external sensors.

A cellular module 16 may be coupled to cellular antenna 14, a Wi-Fi module 17 may be coupled to Wi-Fi antenna 15, and an LPWAN module 33 may be coupled to LPWAN antenna 34. In some embodiments, one or more additional communications modules 35 and associated antennas 36 may additionally be coupled to at least one of the one or more controllers 18 for providing one or two-way communications with an external client or service. In various embodiments the base unit may comprise any or all of the preceding communication modules depending on the desired configuration. In an illustrative aspect, battery 19 is a lithium ion or lithium polymer battery. Base unit 01 can be powered either by battery 19 and/or by a hard wired connection to an external power supply 22. This external power supply can be a separate battery pack or a wall outlet to allow continuous power supply.

It should be understood that sensors 07, 08, 09, 10, 11, 12, 13, and 20 may be any sensor suitable for detecting the condition that the sensor is to sense. Sensors may also be used in combination to generate new or more accurate information. For example, the temperature sensor 11 may be paired with the smoke detector 13, humidity sensor 10, photodiode sensor, and PIR sensor to better detect conditions indicative of fire. Temperature sensor 11 may be paired with humidity sensor 10, photodiode sensor, and PIR sensor to better detect mold growth conditions or conditions indicative of water leaks. A photodiode sensor may be paired with a humidity sensor, UV sensor, VOC sensor, and/or a temperature sensor to better detect undesirable worker conditions. A photodiode sensor may be paired with a noise sensor to better detect a site intruder or intruders. A photodiode sensor may be paired with a humidity sensor and/or a temperature sensor to better detect the flashing and/or spreading of a fire. An infrared sensor, either alone or in combination with another sensor, may better predict a type of fire, for example, differentiating between a welding arc fire versus a smoldering fire.

One or more controllers 18 obtains input data regarding sensed conditions or parameters from sensors 07, 08, 09, 10, 11, 12, 13, and 20 and sends a message via wireless communication using cellular module 16, Wi-Fi module 17, LPWAN module 33 (or a wired connection) to server 04 containing data indicative of the conditions or parameters sensed by one or more of the sensors. Controller 18 is configurable, via wireless programming, to set which sensors 07, 08, 09, 10, 11, 12, 13, and 20 are active and how frequently data regarding the sensed conditions or parameters of each sensor are transmitted to server 04. Server 04 can configure controller 18 via wired or wireless communication to set the sensor settings and thresholds as well as frequency, time, and contents of controller 18 messages. For example, controller 18 may send data regarding the sensed conditions or parameters of sensors 07, 08, and 09 at a different frequency than that of sensors 10, 11, 12, 13, and 20 as dictated by server 04. Controller 18 can be configured to generate alerts and warnings, as well as to send data regarding the sensed conditions or parameters of one or more of the sensors at a set frequency rate irrelevant of the sensed conditions or parameters. Alternatively controller 18 can be configured to send data regarding the sensed conditions or parameters of one or more of the sensors only upon the sensed conditions or parameters being indicative of a possible event of concern. A controller 18 may also store data and/or instructions in one or more connected sources of non-volatile memory 39 and/or volatile memory 40, for example, random access memory (RAM).

The system or a controller 18 may instruct one or more components of one or more base units to enter various modes of operation in order to make the system operate more efficiently. In various embodiments, the system or controller 18 may keep one or more sensor types in an OFF state or low power mode by default and only operate less energy or resource intensive sensors regularly. When readings from the one or more less energy or resource intensive sensors indicate a possible event or preliminary event, the system or controller 18 may permanently, temporarily, or intermittently activate or change the operating mode of one or more of the sensors in an off state or low power mode to gather additional data regarding the event or preliminary event. For example, the system may keep one or more infrared sensors in an OFF state and one or more additional sensors in an ON state, for example, a temperature sensor and/or a smoke sensor. If and when the one or more additional sensor readings indicate a spike in a temperature or presence of smoke, the system can activate the infrared sensor to read a temperature gradient and more accurately confirm a suspected event such as a fire.

Alerts and/or warnings may be generated by either the base unit controller 18 or the software platform running on server 04 when selected conditions exist. Select conditions may be detected through analysis of measurements of one or more individual sensors or sensor types. Alerts and/or warnings generated due to analysis of temperature sensor 11 data may be caused by the temperature of a region within the location being outside of one or more selected temperature ranges, the temperature rising at a rate that could be deemed unsafe or indicative of a fire, or temperature dropping at a rate that is undesired. Alerts and/or warnings generated due to analysis of humidity sensor 10 data may be caused by the humidity of a region within the location being outside of a selected humidity range or the humidity being at a level that could cause damage to millwork or other materials.

Alerts and/or warnings generated due to analysis of dust particulate sensor 08 data may be caused by dust particulate levels of a region within the location being outside of one or more selected dust particulate ranges or dust particulate levels being in violation to OSHA or property owner protocols/requirements and/or any specifications made in contracts, agreements, or stipulations. Alerts and/or warnings generated due to analysis of any type of gas sensor (e.g. $CO_2$, CO, oxygen, $H_2S$, methane, propane, VOC's, etc.) data may be caused by gas levels within a region of the location being outside of one or more selected gas level ranges, gas levels exceeding flammable or explosive levels or gas levels exceeding recommended levels for worker safety.

Alerts and/or warnings generated due to analysis of accelerometer or vibration sensor 09 data may be caused by vibration within a region of the location being outside of one or more selected vibration ranges, vibration that exceeds structural strength levels, vibration that exceeds foundation strength levels, vibration at frequencies at a building or material's resonant frequency, or vibration that exceeds customer imposed limits or that may be disruptive or dangerous to surrounding structures. Alerts and/or warnings generated due to analysis of strain sensor 12 data may be caused by strain exerted on an object or entity being outside of one or more selected strain ranges, strain levels which indicate the possibility of the existence or future occurrence of structural damage, strain levels which indicate the possibility of the existence or future occurrence of foundation or framework damage, or strain levels which indicate the possibility of the existence or future occurrence of roof failure or collapse.

Alerts and/or warnings generated due to analysis of fluid flow sensor data, sourced from flow sensors mounted on or in on-site piping, may be caused by flow levels being outside of one or more selected flow ranges, flow levels considered irregular based on past trends, flow being detected when no flow should exist and/or flow indicative of a water leak.

Alerts and/or warnings generated due to analysis of electrical power level data, electrical current data, electrical impedance data, and/or electrical voltage data may be caused by levels being outside of one or more selected ranges, levels considered irregular based on past trends, levels being detected when none should exist and/or levels indicative of a power surge or electrical fire event.

The software platform running on server 04 may also be able to raise alerts due to analysis of data generated by more than one type of sensor. Combining sensor data from several different types of sensors may provide for more accurate detection of certain conditions, or detection of conditions that is not possible by using one sensor individually.

One or more internal sensors 20, external sensors 23, and/or sensor arrays 24, 424 may be configured to detect weather data. For example, the one or more internal sensors 20, external sensors 23, and/or sensor arrays 24, 424 may include an ambient pressure sensor, humidity sensor, wind sensor, and/or other types of sensors known to those in the art for detecting weather phenomena. The one or more internal sensors 20, external sensors 23, and/or sensor arrays 24, 424 may be disposed on the exterior of the site(s) being monitored in order to more directly contact the environment outside of the site, such as an ambient weather environment.

Data generated by accelerometer(s) or vibration sensor(s) may be analyzed in conjunction with data generated by strain sensor(s) to monitor, detect, or predict structural foundation damage, including cracking or widening of existing cracks, or structural roof failure.

Data generated by accelerometer sensor(s) may be analyzed in conjunction with data generated by gyroscope sensor(s) and strain sensor(s) to more accurately monitor, detect, and/or predict building sway or vibration levels that may exceed structural safety levels as well as flexure of structural and support beams/members.

Data generated by temperature sensor(s) may be analyzed in conjunction with data generated by oxygen sensor(s), humidity sensor(s), smoke sensor(s), dust particulate sensor(s), IR sensors, PIR sensors, photodiode sensors, $CO_2$ sensor(s), and/or CO sensor(s) to more accurately monitor, detect, and/or predict conditions indicative of fire or the potential for fire. Software system running on server 04 may track the spread of fire throughout a site and monitor, detect, and/or predict the direction of propagation of the fire as well as how fast the fire will spread using related sensor data (e.g., oxygen levels, temperature levels, and/or humidity levels). A notification or other software system running on server 04 may provide this information to a third party such as a fire department to allow for a more efficient response to the fire.

Data generated by humidity sensor(s) may be analyzed in conjunction with data generated by temperature sensor(s), PIR sensors, and/or microphone(s) to more accurately monitor, detect, predict, and/or locate water leaks or running water.

Data generated by humidity sensor(s) may be analyzed in conjunction with data generated by temperature sensor(s), light sensor(s), IR sensors, PIR sensors, and/or ultraviolet (UV) sensor(s) to more accurately monitor, detect, and/or predict conditions which may support mold growth.

Data generated by temperature sensor(s) may be analyzed in conjunction with data generated by humidity sensor(s), microphone(s), light sensor(s), UV sensor(s), PIR sensors, oxygen sensor(s), and/or carbon dioxide sensor(s) to more accurately monitor, detect, and/or predict improper seals, leaks, cracks, holes, or related damage in the building envelope.

Data generated by microphone(s) may be analyzed in conjunction with data generated by accelerometer(s), vibration sensor(s), temperature sensor(s), IR sensors, PIR sensors, photodiode sensors, and/or humidity sensor(s) to more accurately monitor, detect, and/or predict building security and building surveillance.

The server 04 can analyze and record the input data from a plurality of base units 01 for further analysis, for example, by comparing sensor input data throughout a larger region of a site or detecting trends in sensor input conditions between multiple regions of a site or between several sites, and can generate additional alerts, warnings, or reports that could not be possible based off of the data from an individual base unit 01. The server 04 can also source data to be used when performing analytics from other input methods or sources (e.g., sources on the internet, other API's or SDK's, and any partnering company's products).

Warnings, alerts, and reports generated the controller 18 or the server 04 can be used by the user to prevent and/or mitigate events that have the potential to damage the site or cause an unsafe environment. The user and other personnel on the location (e.g., construction site, oil rig or refinery, mining location, industrial site, and/or renovation site), or the personnel managing the location can have records of environmental factors and data for recourse on possible insurance claims, warranty claims, equipment failures, and/or damages to the job site.

In some embodiments, base units 01 may further comprise one or more transceivers 25 for communicating with an external device, for example, a worker's handset, cell phone, tablet, or other mobile electronic device. Transceiver 25 may be a low energy transceiver such as a Bluetooth module, ZigBee module, LPWAN module, or other low or high energy transceivers known to those in the art. Transceiver 25 may be configured to locate, identify, or communicate with one or more external devices within its signal range.

In other embodiments, base units 01 may be connected to one or more external peripherals 30 including any manner of electronic, mechanical, or other device capable of being controlled by or communicating with the base unit. An external peripheral 30 may comprise an actuator or other non-sensor device (or array of actuators or other non-sensor devices) capable of performing an action to affect the site or environment proximate to said base unit 01 or peripheral 30. A peripheral 30 may be configured to toggle one or more devices between an ON and an OFF state or control other aspects of operation. For example, a peripheral 30 may control the ON/OFF state or operating mode of one or more propane heaters, fans, lights, humidifiers, and/or other device disposed in and around the site being monitored. An actuator or other non-sensor device (or array of actuators or other non-sensor devices) serving the function of a peripheral 30 as described herein may instead be disposed internally within the housing of the base unit.

In other embodiments, base units 01 may comprise one or more user interface (UI) elements 26 and/or physical buttons 27. UI 26 may be configured to display information relevant to the site or site being monitored. UI 26 and/or physical button 27 may be further configured to trigger an action or omission in response to being pressed or otherwise activated by a user. For example, responsive to a user pressing physical button 27 or UI element 26, the UI 26 and/or an external handset may display a map of the site or sites being monitored along with a location of the base unit and the worker location at that base unit, initiate a call for help, or signal an emergency at that location. A button 27 may, for example, be configured to perform a predetermined action when a user interacts with it in a certain manner. For example, holding down a particular button may trigger an alarm, whereas tapping the button may open a communications channel allowing the user to speak directly with security personnel.

In some embodiments, base units 01 may comprise one or more speakers 29 and/or intercoms 28. Base units in communication with one and other may therefore be configured to function as a distributed worker communication system using said speakers 29 and intercom 28. The intercom system may also involve external handsets and devices also connected to the base unit. The speaker 29 may also be used to play alert sounds or relay other audible information to the site. The speaker 29 may also be used to locate individual devices upon user engagement with software platform.

In various embodiments, data received by or transmitted from sensors, base units, and/or the server may be encrypted using one or more data encryption methods. For example, data may be encrypted using block chain encryption, public key encryption, symmetric key encryption, and/or any combination of encryption methods know to those in the art. The encrypted data may be subsequently decrypted by the server 04, peripheral 30, other system component, and/or third-party device intended to decrypt the encrypted information.

In further embodiments, data received by or transmitted from sensors, base units, and/or the server may be associated with one or more pieces of metadata. For example, data received by or transmitted from sensors, base units, and/or the server may be time stamped.

In certain embodiments, a base unit may be configured function as a site utility power hub 01 capable of providing additional power to one or more internal or external power-intensive components. For example, the base unit 01 may be attached to site utility power instead of running from a battery and contain one or more power ports that relay the site utility power and allow one or more external power-intensive components to be plugged into it. A power intensive component may include a high-performance gas or dust sensor or wireless communications device such as a wireless gateway, router, or repeater.

It may be further desirable in certain embodiments to configure this base unit to function as a wireless communications hub 01 for various devices in use around the site that are not necessarily part of the present system. Accordingly, the base unit functioning as a communications hub 01 may contain one or more wireless receivers, transceivers, gateways, and/or repeaters capable of providing wireless connectivity on various frequency bands and/or using various wireless communications protocols known to those in the art. The base unit functioning as a communications hub 01 may further contain one or more active and/or passive radio-frequency identification (RFID) readers for detecting active and/or passive RFID tags, respectively, located on or near the site. For example, to track any equipment worth more than a certain amount a site operator may install one or more transmitters, transceivers, RFID tags, or other communicative devices known in the art to said equipment such that the base unit functioning as a communications hub 01 may identify and/or locate the equipment over the appropriate frequency band. Such a base unit 01 may further contain one or more power outlets configured to relay and provide site utility power to external sensors 23, 424, peripherals 30, and/or other power-intensive components around the site.

A base unit may also be designed to function as a storage hub 01 and be made significantly larger in size than a typical base unit. For example, a base unit functioning as a storage hub 01 may contain specialized cavities for storing typical base units 01, sensors 20, 23, sensor arrays 24, 424, peripherals 30, and/or other equipment leading up to a deployment of the present system at a site.

A base unit may be configured to function as a power pillar 01 that incorporates any or all of the functionality of a site utility power hub, wireless communications hub, and/or storage hub discussed above. The power pillar may include additional internal components including an emergency alert light, battery backup and/or uninterruptible power supply (UPS), user interface and/or display, or other components enabling it to better function as a hub of power, communications, and/or storage.

Base units 01 may be further configured to perform self-diagnostics and/or generate reports concerning the status of connected sensors, peripherals, and other connected internal and external system components. A base unit 01 may store in its own memories 39, 40 and/or send such diagnostic information to any connected component including another base unit 01 or a server 04 where it may be subsequently accessed by a user or by a software component of the system. For example, the base unit 01 can detect and communicate information relating to battery status, component health, sensor health, calibration, and/or other diagnostics. The information may be sent, for example, to a connected user's handset where they may view said information, or to the server 04 where it may be stored in one or more databases for subsequent access. Each base unit 01, sensor 20, 23, 24, 424, peripheral 30, and/or other system component may further contain a unique identifier (for example a serial number) allowing the system to uniquely identify each system component in the course of performing the various functions disclosed herein.

In various embodiments, base units 01 may be further configured to enable the system to identify and track potential intruders or security breaches using the various sensor types and combinations discussed herein. For example, a combination of thermal sensors, microphones, IR sensors, and/or any of the other sensor types disclosed herein may be used to detect intruder or security related events. The base unit 01 may notify appropriate security and/or emergency personnel (for example police) responsive to detecting an intruder or other security breach.

FIGS. 3A-3D illustrate one embodiment of a base unit 01. Base unit 01 has a front housing surface 310 and a lateral housing surface 320.

Figure 3A:
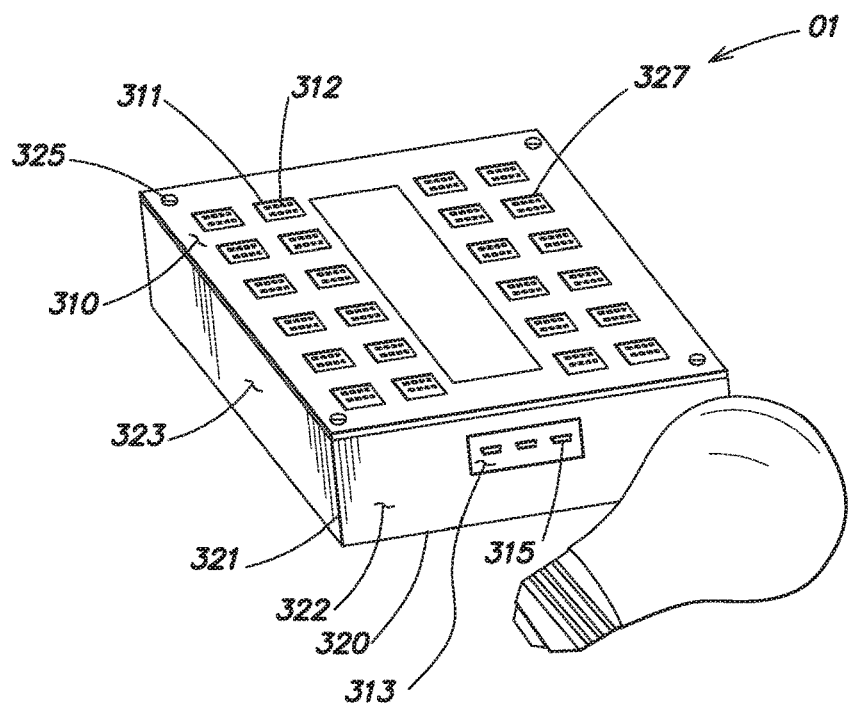
FIG. 3A shows an illustrative view of an embodiment of a base unit.

As shown in FIG. 3A, lateral housing surface 320 may be continuous forming a rectangular base. Continuous lateral housing surface 320 may take on any number of shapes consistent with a desired form of base unit 01. Lateral housing surface 320 may also be segmented into one or more secondary lateral housing surface segments 322, 323 separated by one or more corresponding lateral housing surface edges 321. Lateral housing surface segments 322, 323 and edges 321 may take on any number of shapes and configurations consistent with desired form of base unit 01. Lateral housing surface 320 or surface segments 322, 323 may be composed of any material or combination of materials consistent with desired manufacturing specifications including, but not limited to, plastic, metal, wood, polymer, natural or artificial materials and composite materials.

Base unit 01 may optionally possess one or more lateral port surfaces 313 for housing one or more groups of lateral ports 315. Lateral port surface 313 may be recessed or embossed relative to lateral housing surface 320 or surface segments 322, 323. Lateral ports 315 may be disposed directly on one or more parts of lateral housing surface 320 or surface segments 322, 323 instead of on a lateral port surface 313. Lateral ports 315 may each comprise or consist of a communication port for communicatively coupling an external sensor or other electronic peripheral, power port for providing power to an external sensor or other electronic peripheral, or a hybrid port capable of providing both communication capabilities and power. Lateral port surfaces 313 and lateral ports 315 may be composed of any material or combination of materials consistent with desired manufacturing specifications including, but not limited to, plastic, metal, wood, polymer, natural or artificial materials and composite materials.

Front housing surface 310 fixedly abuts and is disposed perpendicular to lateral housing surface 320 or surface segments 322, 323, opposite rear housing surface 340. Front housing surface 310 may be fixed to lateral housing surface 320 or surface segments 322, 323 by one or more corresponding housing surface connectors 325, for example, screws, bolts, rivets, or other connectors known in the art. Front housing surface 310 may be composed of any material or combination of materials consistent with desired manufacturing specifications including, but not limited to, plastic, metal, wood, polymer, natural or artificial materials and composite materials.

In some embodiments, front housing surface may also comprise one or more front port surfaces (not pictured) each comprising one or more front ports (not pictured). A front port surface may be recessed or embossed relative to front housing surface 310. Front ports may be disposed directly on one or more parts of front housing surface instead of on a front port surface. Front ports may each comprise or consist of a communication port for communicatively coupling an external sensor or other electronic peripheral, power port for providing power to an external sensor or other electronic peripheral, or a hybrid port capable of providing both communication capabilities and power.

Figure 3B:
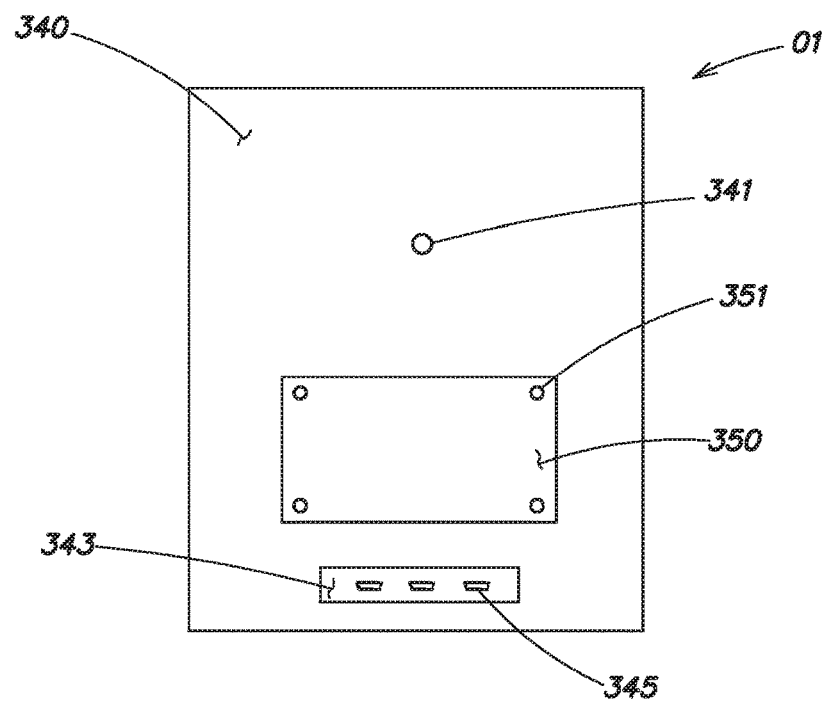
FIG. 3B shows another illustrative view of an embodiment of a base unit.

As depicted in FIG. 3B, rear housing surface 340 fixedly abuts and is disposed perpendicular to lateral housing surface 320 or surface segments 322, 323, opposite front housing surface 310. Rear housing surface 340 may be fixed to lateral housing surface 320 or surface segments 322, 323 by one or more corresponding housing surface connectors 325, for example, screws, bolts, rivets, or other connectors known in the art (not shown in figure). Rear housing surface 340 may instead be contiguous with or chamfered relative to lateral housing surface 320 or surface segments 322, 323. Rear housing surface 340 may be composed of any material or combination of materials consistent with desired manufacturing specifications including, but not limited to, plastic, metal, wood, polymer, natural or artificial materials and composite materials. In some embodiments, rear housing surface 340 includes one or more mounting openings 341 for coupling the base unit to a mounting piece 360. Mounting opening or openings 341 may include a threaded aperture. In certain embodiments, a mounting opening 341 may instead comprise a mounting protrusion instead of an opening if a protrusion would better enable a mounting piece 360 to attach to the base unit.

Base unit 01 may optionally possess one or more rear port surfaces 343 for housing one or more groups of rear ports 345. Rear port surface 343 may be recessed or embossed relative to rear housing surface 340. Rear ports 345 may be disposed directly on one or more parts of rear housing surface 340 instead of on a rear port surface 343. Rear ports 345 may each comprise or consist of a communication port for communicatively coupling an external sensor or other electronic peripheral, power port for providing power to an external sensor or other electronic peripheral, or a hybrid port capable of providing both communication capabilities and power. Rear port surface 343 may be composed of any material or combination of materials consistent with desired manufacturing specifications including, but not limited to, plastic, metal, wood, polymer, natural or artificial materials and composite materials. Port surfaces and ports may be similarly disposed on the front housing surface 310 instead of rear housing surface 340 or lateral housing surface 320 or surface segments 322-323.

As depicted in FIGS. 3A and 3B, front housing surface 310 may comprise one or more primary apertures 311 each optionally covered by, fitted with, or integral with one or more primary aperture gratings 312. Although in this embodiment primary apertures 311 are only depicted on front housing surface 310, lateral housing surface 320 or surface segments 322, 323 or rear housing surface 340 may also comprise one or more primary apertures 311, which may each optionally be covered by, fitted with, or integral with one or more primary aperture gratings 312. A primary aperture 311 may, for example, function as a vent or filter to allow and/or restrict various types or quantities of air or other gasses, particles, and/or moisture from entering the base unit 01.

Base unit 01 may possess one or more cavities 356 for removably disposing sensors and/or sensor arrays each communicatively coupled to the controller 18 or other base unit 01 component. In some embodiments, all or part of a cavity 356 may abut all or part of a primary aperture 311. In FIG. 3B sensor hatch 350 is depicted as being disposed on rear housing surface 340, however one or more sensor hatches 350 may be disposed on front housing surface 310, or on lateral housing surface 320 or surface segments 322, 323. Sensor hatches 350 may be removably mounted to the corresponding housing via one or more sensor hatch connectors 351, but may also be removably mounted via another means including, but not limited to, a hinge, rivet, screw, latch, or other similar fastening means well known to those in the art. Sensor hatches 350 may also be connected to a pressure sensor, button, or other sensing mechanism to detect when the hatch or cavity is open or closed, and/or to what extent the hatch or cavity is open or closed.

In some embodiments, one or more mounting openings 341 may be alternatively or additionally located on the front housing surface 310, lateral housing surface 320, one or more lateral housing surface segments 322, 323, and/or other base unit surfaces.

Figure 3C:
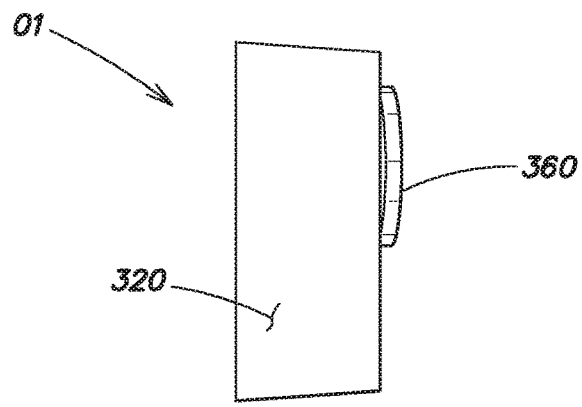
FIG. 3C shows another illustrative view of an embodiment of a base unit.
Figure 3D:
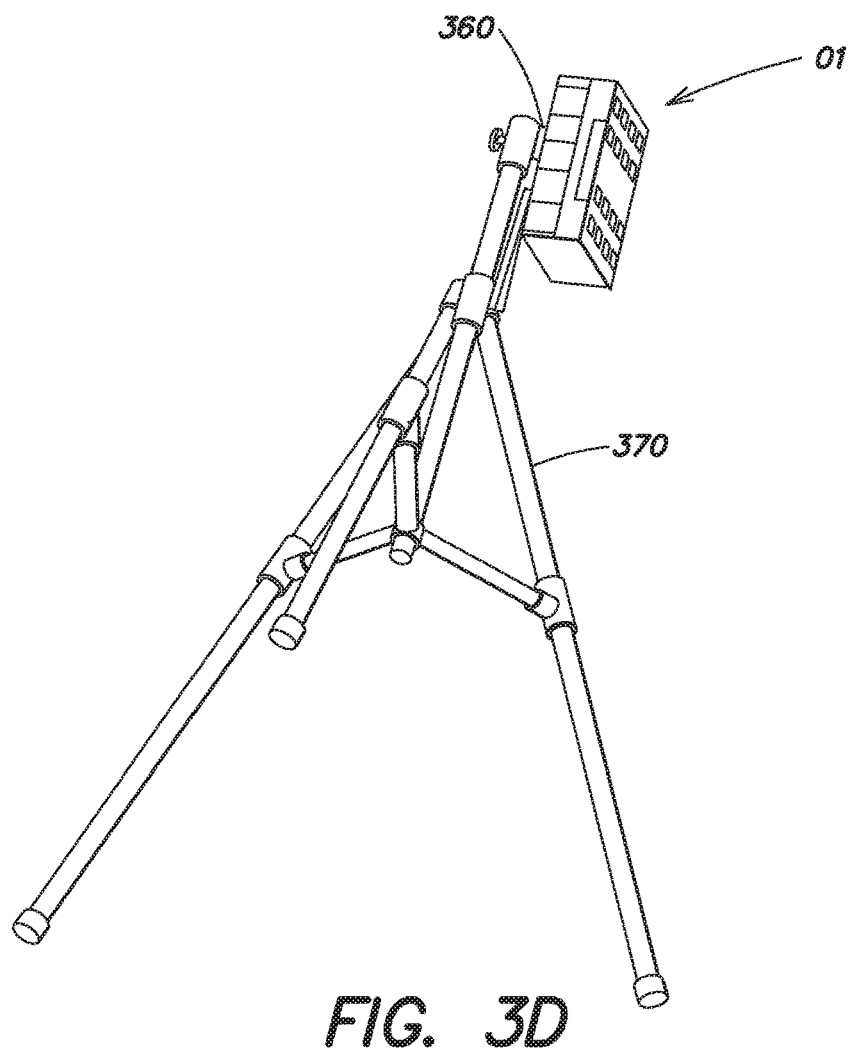
FIG. 3D shows another illustrative view of an embodiment of a base unit.

As depicted in FIGS. 3C and 3D, a housing surface of base unit 310 may be attached to one or more mounting pieces 360 or similar components. In some embodiments, a mounting piece 360 may attach to the base unit via a connection with one or more mounting openings 341 or similar connecting means known to those in the art. For example, mounting piece 360 may include a threaded connector that screws into a mounting opening 341. In other embodiments, a mounting piece 360 attaches directly to a housing surface of the base unit. Mounting piece 360 may alternatively comprise a bracket, brace, connector, fastener, magnet, clip, or other securing means known to those in the art for removably fastening base unit to an external surface or structure. Mounting piece 360 may removably attach to a portion of a site surface or support structure including, but not limited to, walls, pipes, windows, and other site surfaces known to those in the art. In some embodiments, removably attached means able to alternate between being removed and reattached without causing any damage or any substantial damage to the surface or structure on which the base unit is being mounted. Mounting piece 360 may attach to a support structure 370, for example, a stand or tripod, either portable or fixed.

Figure 4:
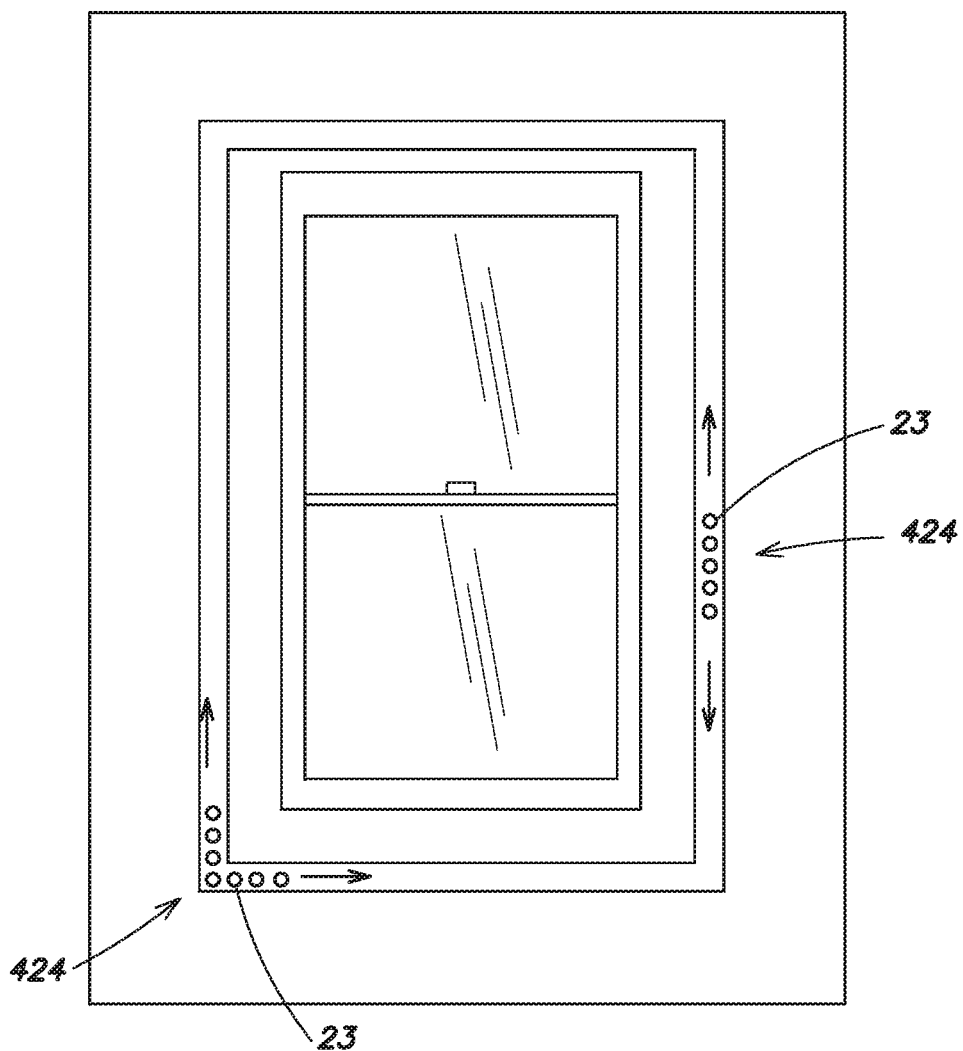
FIG. 4 shows an illustrative diagrammatic view of an embodiment of an external sensor array for use in a system disclosed herein.

FIG. 4 depicts a collection of external sensor modules forming an external sensor array 424 that may contain humidity sensor(s), moisture sensor(s), and/or water contact sensor(s) intended to monitor for the specific condition of water ingress within an exterior wall of a building. Illustratively, the sensor array 424 is deployed surrounding a window frame, within the wall. It should be understood that while the following description references deployment surrounding a window frame, the sensor array 424 may be placed in any location. Data from humidity sensor(s), moisture sensor(s), and/or water contact sensor(s) may be processed by a microprocessor and wirelessly (or by a wired connection) transmitted to a base unit 01, and further wirelessly (or by a wired connection) transmitted to the server 04, analytic system, and/or additional software platform.

A further embodiment of an internal sensor 20, external sensor module 23, and/or sensor array 24, 424 may contain temperature sensor(s) intended to monitor for the specific condition of pipe freezing within a wall of a building. The external sensor module 23 and/or external sensor array 424 may be mounted directly to water pipes within wall cavities suspected of having a high risk of freezing when the site is exposed to low environmental temperatures. Data from temperature sensor(s) may be processed by a microprocessor and wirelessly transmitted to a base unit 01, and further wirelessly (or by a wired connection) transmitted to the server 04 and software platform. A third embodiment of an internal sensor 20, external sensor module 23, and/or sensor array 24, 424 may contain temperature sensor(s) and humidity sensor(s) intended to monitor for the specific condition of mold growth within a wall of a building. An external sensor module 23 or external sensor array 424 may be mounted within wall cavities suspected of having an increased risk of mold growth. Data from temperature sensor(s) and humidity sensor(s) may be wirelessly (or by a wired connection) transmitted to a base unit 01, and further wirelessly (or by a wired connection) transmitted to the server 04, analytic system, and/or additional software platform. In certain embodiments, the data may first be processed by a controller or microprocessor embedded in or coupled to internal sensor 20, external sensor module 23, and/or sensor array 24, 424 prior to transmission.

Figure 5:
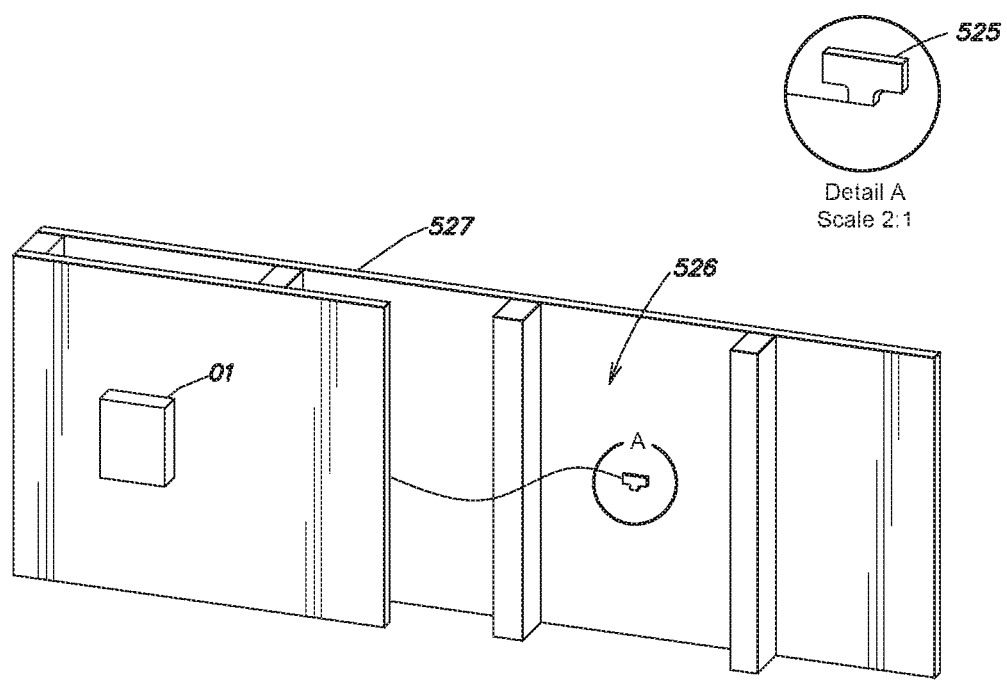
FIG. 5 shows an illustrative diagrammatic view of an embodiment of an external sensor module for use in a system disclosed herein.
Figure 6A:
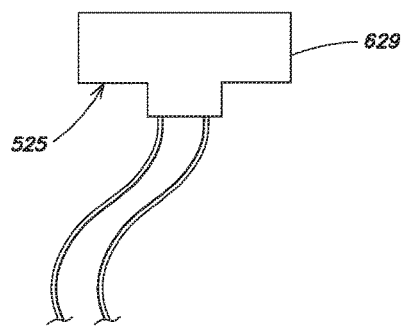
FIG. 6A shows an illustrative diagrammatic view of another embodiment of an external sensor module for use in a system disclosed herein.
Figure 6B:
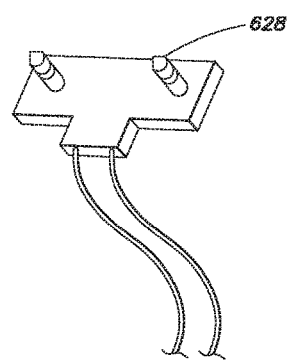
FIG. 6B shows an additional view of the sensor module of FIG. 6A.
Figure 6C:
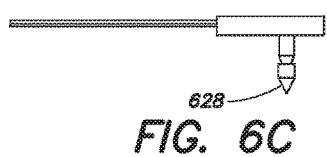
FIG. 6C shows an additional view of the sensor module of FIG. 6A.
Figure 6D:
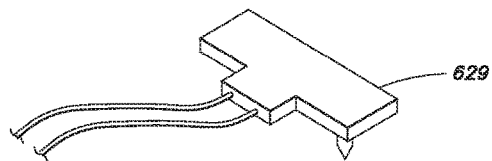
FIG. 6D shows an additional view of the sensor module of FIG. 6A.

Internal sensor 20, external sensor module 23, and/or sensor array 24, 424 may be embodied as a moisture sensor 525. FIG. 5 is a diagram of one embodiment of a pin type moisture sensor 525 communicating with base unit 01 via a wired connection. Moisture sensor 525 may be mounted within the cavity of a wall during the construction of a building, with the pins inserted into the interior side of the building envelope substrate 526. Alternatively, moisture sensor 525 may be mounted with the pins inserted into the facade 527 side of the building substrate 526. A plurality of moisture sensor(s) 525 may be wired together to allow for extended moisture monitoring of one region of the substrate 526.

FIGS. 6A-6D show different views of an embodiment of moisture sensor 525. In this embodiment, moisture sensor 525 is a pin type moisture sensor. Pins 628 are designed with barbs to hold moisture sensor 525 in substrate 526 after insertion, securing contact between the substrate and pins. The two pins 628 are implemented to measure the resistance through a specified, uniform distance of substrate, at a certain depth into the substrate. In an alternative embodiment, four pins 628 may be used to measure moisture at two different depth levels within the substrate. Pins 628 may be manufactured from copper, stainless steel, titanium, or other related materials/alloys to make them resistant to corrosion.

Base section 629 of the moisture sensor 525 may be made using a printed circuit board to hold strict tolerances of distance between the pins 628 and to connect the pins 628 to external wiring. Printed circuit board within base section 629 may contain electronics including resistors and voltage comparator(s). Alternatively, printed circuit board within base section 629 may contain no electronics and be comprised strictly of pins 628, internal traces, and external wiring with secured contacts.

All circuitry needed for operation and reading of moisture sensor 525 may be contained within base unit 01 or externally on the sensor cable connecting the base section 629 to the base unit 01. This will allow the moisture sensor 525 to be cheap, disposable, and safe to be deemed a "sacrificial sensor" and permanently left within the wall cavity after removal of base unit 01 from the site. One embodiment of the base section 629 will include the electrical circuitry, removing the need of the circuitry to be built into the base unit 01 or on an external sensor cable. Base section 629 will encapsulate all open, conductive material except for pins 628, effectively making moisture sensor 525 assembly and wiring waterproof. Base section 629 and pins 628 may be designed in a fashion to allow the moisture sensor 525 to be inserted into the substrate 526 in the same fashion as one would push a tack into a tackboard.

Base unit(s) 01 may be able to detect if wireless communication to the server 04 is interrupted or disconnected and alternatively default into an access point mode, where nearby base unit(s) 01 may be able to connect to each other. This will create a mesh network between localized base unit(s) 01, and allow for localized data processing of data generated by a plurality of base unit(s) 01. Data from all of the base unit(s) 01 may be wirelessly transmitted to server 04 when one of the now mesh network connected base unit(s) 01 regains connection to the server 04.

Those skilled in the art will appreciate that numerous modifications and variations may be made to the above disclosed embodiments without departing from the spirit and scope of the present invention.

Figure 7A:
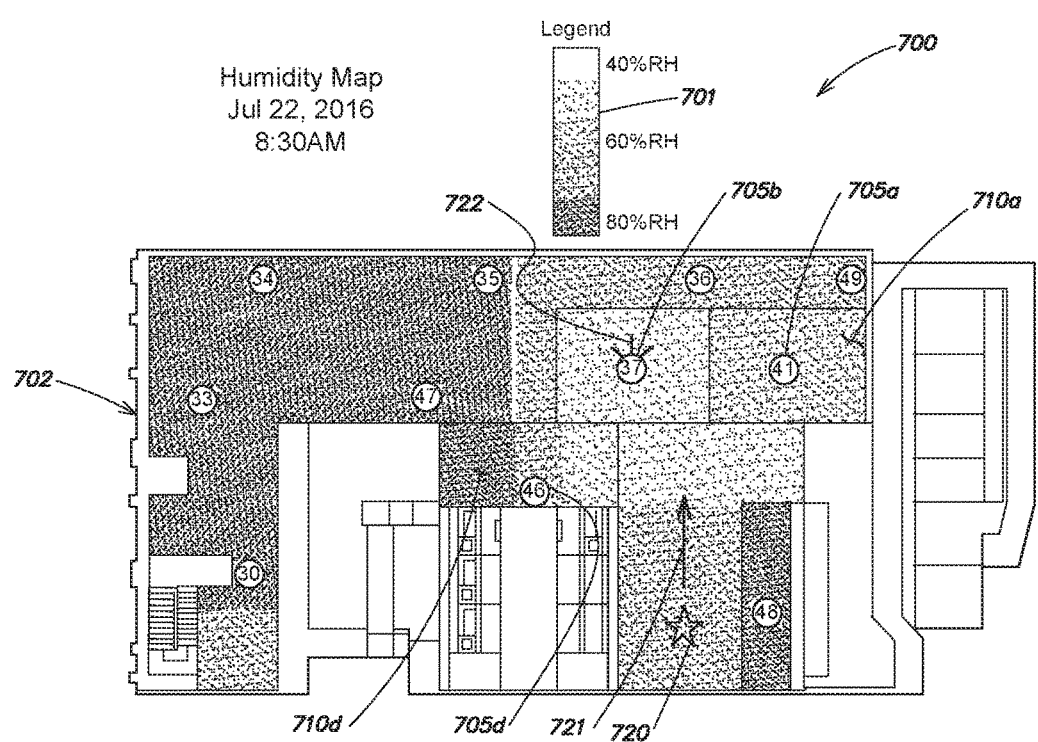
FIG. 7A shows an illustrative diagrammatic view of an embodiment of a graphical zone map generated by a system disclosed herein.
Figure 7B:
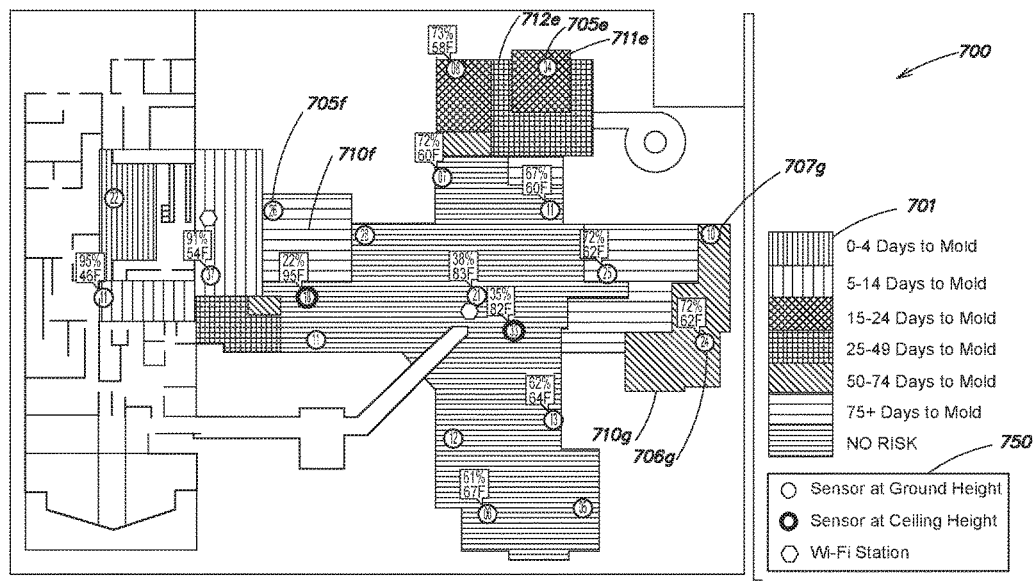
FIG. 7B shows an illustrative diagrammatic view of another embodiment of a graphical zone map generated by a system disclosed herein.

FIGS. 7A and 7B depict two embodiments of graphical zone maps 700 depicting one or more parameters detected by a plurality of sensors disposed at a monitoring site or sites. The zone maps 700 comprise a graphical representation of monitoring data shown visually in real time, near real time, or at other desired times. The maps 700 further comprise a plurality of zones 710 each corresponding to a respective area of a building floorplan or site map 702 and a sensing location 705. In various embodiments, a sensing location 705 corresponds to the location of one or more base units 01 and/or one or more external sensors 23 or sensor arrays 24, 424 communicatively coupled to the monitoring system. In some embodiments, the size of each zone 710 may correspond to an absolute or preferred monitoring range of the one or more base units 01 and/or one or more external sensors 23 or sensor arrays 24, 424 disposed at each corresponding sensing location 705. Authorized users of the monitoring system may access a zone map via the server or an enabled base unit, either remotely, for example, via the internet, or locally through a direct wired or wireless connection known to those in the art. In some embodiments, the system may be programmed determine a plurality of zones 710 each corresponding to a sensing location 705 corresponding to one or more ranges, sensor types, or other relevant characteristics of the one or more base units 01 and/or one or more external sensors 23 or external sensor arrays 424 disposed at each corresponding sensing location 705, or corresponding to one or more site characteristics or sources of external information received by the analytic system as described with respect to FIGS. 11A-11B and 12.

FIG. 7A depicts an embodiment of a continuous or analog zone map. Each zone 710 corresponds to a sensing location 705 corresponding sensing equipment that includes one or more base units 01 and/or one or more external sensors 23 or external sensor arrays 424 capable of detecting a range of values of one or more parameters occurring in or proximate to the corresponding zone 710 at a certain time. For example, the sensing equipment at sensing location 705d may be able to display a gradient of relative humidity (RH) values spatially distributed throughout the corresponding zone 710d in accordance with the legend 701. In other embodiments, the sensing equipment disposed at a sensing location 705 may be able to detect a plurality of values of a single parameter associated with different spatial regions of the corresponding zone 710 that do not correspond to a gradient or any other known pattern. In some embodiments, the sensing equipment disposed at sensing location 705d can depict a composite value derived from multiple sensed parameters that represents the likelihood or other status of a specified event. For example, a combination of sensed humidity and temperature parameters can be combined into a single representation of how many days until mold is likely to grow. Parameter legend 701 associates a range of color values with a value of a certain parameter. Parameter legend 701 may alternatively use shading, saturation, focus, and other continuous values known to those in the art to identify particular values of a parameter. In some embodiments, zones of the zone map showing unacceptable or important values of a measured parameter and/or undesirable or important rates of change in a measured parameter may be identified by blinking or other form of animation.

A sensor location 705 may further possess one or more sensor status indicators 722 each indicating one or more statuses and/or properties of a base unit 01, external sensor 23, or external sensor array 424 corresponding to that sensing location 705. For example, a sensor status indicator 705 may indicate that the base unit 01 located at sensing location 705b has a light 37 that is turned on.

In some embodiments, a zone map may further contain one or more component indicators 720 identifying said component and/or representing one or more aspects of its position or status. A component may be a peripheral 30, base unit 01 not currently being treated as a sensing location 705 by the current zone map, external sensor or sensor array not currently being treated as a sensing location 705 by the current zone map, or other component being monitored and/or controlled by the system. One or more component status indicators 721 may further be included on the zone map indicating one or more statuses or properties of the associated component.

An example of sensor status indicators 722 and/or component status indicators 721 may be an arrow representing the orientation of and/or direction or speed of travel of the corresponding base unit, piece of sensing equipment, or component. Other examples include status indicators that represent an elapsed time since previous calibration, battery status indicators, and indicators of other self-diagnostic data.

The information displayed by one or more system component icons including sensor locations 705, sensor status indicators 722, component indicators 720, and/or component status indicators 721 may be further used to assist in calibrating system components including base units 01, sensors 20, 23, 24, 424, peripherals 30, and/or other components communicatively coupled to the system. Calibration may be performed manually by a user by adjusting an operating mode of a system component responsive to the information conveyed by the various system component icons. In some embodiments, the system may be programmed to perform automatic calibration responsive to determining that one or more statuses of one or more system components meets or exceeds one or more known thresholds.

FIG. 7B depicts an embodiment of a discrete zone map. Each zone 710 corresponds to a sensing location 705 containing sensing equipment that includes one or more base units 01 and/or one or more external sensors 23 or external sensor arrays 424 capable of detecting a finite amount of values of one or more parameters occurring in or proximate to the corresponding zone 710 at a certain time. For example, in the present figure the sensing equipment disposed at sensing location 705f can be assigned exclusively to zone 710f and depict the value of the parameter representing how many days until mold is likely to grow within that zone. In some embodiments, the sensing equipment disposed at sensing location 705f can depict a composite value derived from multiple sensed parameters that represents the likelihood or other status of a specified event. For example, a combination of sensed humidity and temperature parameters can be combined into a single representation of how many days until mold is likely to grow. In other embodiments, a zone can be divided into one or more sub-zone, each sub-zone corresponding to its own discrete parameter value of continuous range of parameter values. For example, the sensing equipment corresponding to sensing location 705e can be assigned exclusively to monitor zone 710e, which is further divided into first sub-zone 711e and second sub-zone 712e. A first subset of the sensing equipment corresponding to sensing location 705e can be assigned to monitor sub-zone 711e, while a second subset of the sensing equipment corresponding to sensing location 705e can be assigned to monitor sub-zone 712e. In accordance with the legend 701, discrete zone map can simultaneously depict a different parameter value in the first sub-zone 711e versus the second sub-zone 712e. In other embodiments, multiple groups of sensing equipment, for example, the sensing equipment corresponding the sensing locations 706g and 707g may be assigned to monitor a single zone, for example, zone 710g. A sensor legend 750 may also be provided and contain identifying and/or status information about the types of sensors and/or base unit disposed throughout the floorplan 702, for example, the type of each piece of sensing equipment, whether the piece of sensing equipment is mobile or stationary, the location of each piece of sensing equipment, or any other applicable sensing equipment characteristics.

A discrete or continuous zone map may also comprise a coverage map that depicts sensor deployment information without depicting any sensed parameters. For example, a coverage map may depict sensor type, location, ranges, recommended zones, and/or additional sensor characteristics in order to help system users develop a monitoring plan and/or assess monitoring capabilities.

Any and all features described with reference to a discrete zone or map may be applied to a continuous zone map and vice versa wherever applicable. Zone maps may be hybrids in which some zones are continuous while others are discrete with respect to any or all of parameters represented. Some zones may be configured to represent some parameters as continuous, but represent other parameters as discrete. Different zones and sub-zones may be monitored by and associated with any one of a base unit, sensor, group of sensors, or any combination thereof. Although FIGS. 7A and 7B depict two-dimensional zone maps each corresponding to a two-dimensional floorplan, a three-dimensional zone map may also be used corresponding to a three-dimensional representation of the site or sites being monitored. A zone map may also be provided as a simulation not corresponding to any current placement of base units to assist in simulating prospective monitoring deployments in advance.

The system may further be configured to provide a monitoring and/or control interface containing text or icons representing any or all of the features discussed in FIG. 7A-7B or throughout this disclosure. The monitoring and/or control interface may allow a user to observe the status of and/or control the operation of one or more of said components responsive to an action such as clicking on the appropriate text, link, and/or icons. For example, the system may indicate that a component is malfunctioning and a user may click on the appropriate icon to disable said component. The monitoring and/or control interface may further contain additional features such as the option to send external notifications, alerts, and/or reports responsive to user action. The monitoring and/or control interface may further permit a user to manually control the operation of one or more base units 01, sensors and sensor arrays 20, 23, 24, 424, peripherals 30, or other components disposed around the site and communicatively coupled to the present system. For example, a user may learn via the monitoring interface that a connected piece of equipment was accidentally left on after the construction crew left and responsively use the control interface to disable said connected piece of equipment. In another example, a user may observe via the monitoring interface that conditions indicative of ice are present and responsively increase the operation of one or more heaters and/or fans in order to better disperse heat around one or more areas of the site.

Figure 8:
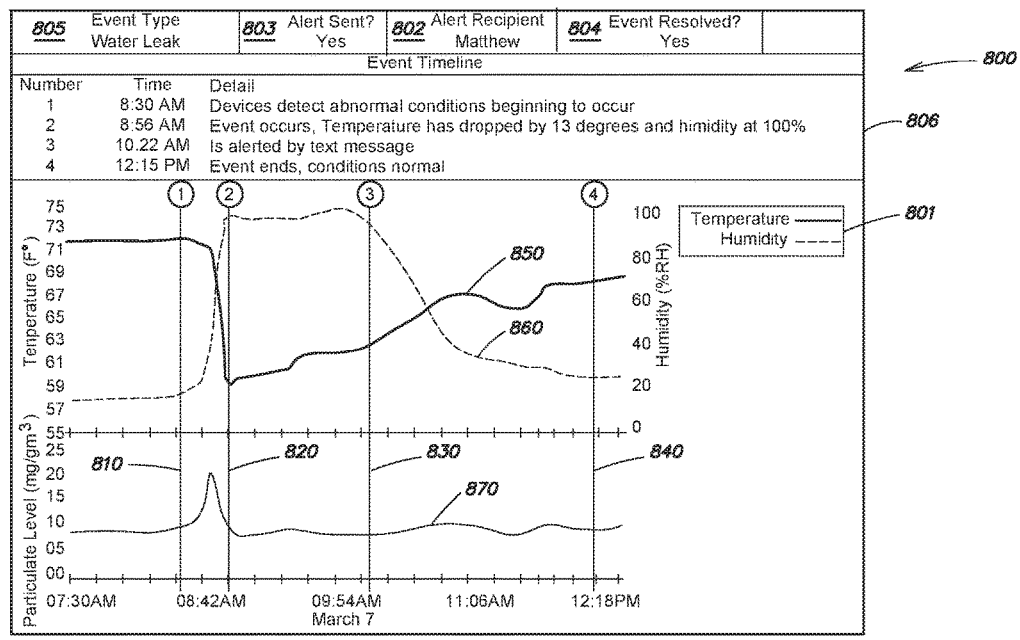
FIG. 8 shows an illustrative diagrammatic view of a graphical display generated by a system disclosed herein of the time evolution of values of multiple monitored parameters associated with a site event.

FIG. 8 depicts an embodiment of a graphical output produced by one or more methods of predicting, detecting, analyzing, and/or depicting an event based on more than one parameter, for example, a first parameter 850, a second parameter 860, and a third parameter 870. The graphical output, the information contained within the graphical output, and the one or more methods used to produce the graphical output may be used in conjunction with the modes of event and preliminary event prediction and response described, for example, in FIGS. 9, 11A-11B, and 12. In the current example, a water leak event may be predicted based on a temperature parameter 850, humidity parameter 860, and a particulate level parameter 870.

In some embodiments, a first time 810 can be identified when the temperature and humidity parameters begin to change at a rate indicative of a possible water leak event and the particulate level begins to rise at a rate also consistent with a possible water leak event. A second time 820 can be identified after the temperate and humidity parameters have stabilized and the particulate level has stabilized. A third time 830 can be identified when the temperature and humidity values begin to return to their previous values before time 810. And lastly, a fourth time 840 can be identified once conditions substantially return to their state prior to the first time 810. This method may be applied to any type or number of parameters capable of being monitored by the present monitoring system, and any type or number of times, events, or preliminary events capable of being tracked and/or identified by the present monitoring system.

In some embodiments, the monitoring system may provide a graphical report of a complex event depicting traces of the parameters involved and/or significant times corresponding to one or more stages of the complex event. As in shown in FIG. 8, the report may include an event timeline 806 listing and describing the significance of each significant time. The report may further include any or all of a listing of the event type 805, the status of any alerts sent in connection with the event at issue 803, alert recipients 802, current event status 804, and any other visual indicators that would assist a user in identifying, monitoring, detecting, depicting, predicting, responding to, or otherwise handling an event at a site being monitored. A legend 801 may also be displayed to visually identify each parameter 850, 860, and/or 870.

Figure 9:
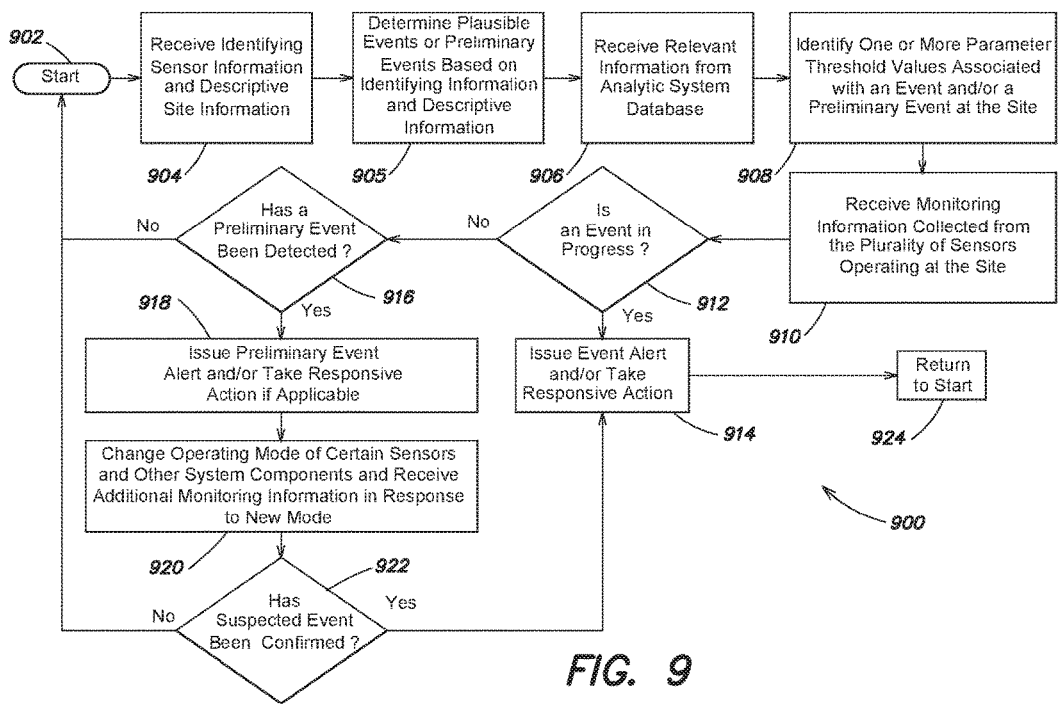
FIG. 9 shows a flowchart describing embodiments of methods of performing site event prediction via an analytic system as disclosed herein.

FIG. 9 depicts a flowchart of a method 900 of one embodiment of the analytic portion of a monitoring system as disclosed herein performing event prediction and response at one or more sites being monitored by the monitoring system. Event prediction and response method 900 begins at act 902 and involves act 904—receiving information and/or accessing the locations, types, and other properties of the one or more sensors connected to or installed in the one or more base units 01 at the site being monitored. The system further receives information describing characteristics of the site itself, including site physical layout and/or dimensions, site environmental conditions including location, climate, or weather, selected site preferences including worker condition thresholds, and current and historical data trends, customer imposed thresholds, micro-weather station data, and/or other site environmental parameters. At act 905, the system determines plausible events or preliminary events that are detectable at the given site based on the information received at act 904. At act 906, the analytic system receives and/or accesses data tailored to the specific configuration of the present site or sites being monitored based on the data received and/or accessed.

The system may maintain one or more databases of previous monitoring and response operations conducted at different sites including the types and locations of various equipment deployed at the site and information surrounding events, preliminary events, and/or other actions that were logged at that site. The system may be further configured to store additional information in a database including site configurations and statuses at different times, environmental statues (for example ambient weather conditions) at different times, base unit configurations and statuses at different times, sensor configurations and statuses at different times, and/or event statuses at different times. This database may be used in connection with any of the data lookup or comparison functions performed within the scope of this disclose. For example, the system may associate a present site with one or more previous sites containing a similar physical and/or environmental layout and similar base unit and/or sensor configuration, and predict, based on events that were detected at the previous sites, one or more events that are more likely to occur at the current site. Such predictions may enhance monitoring and/or response operations at the current site by putting the system and/or system users on notice of elevated sources of risk. Such associations may also assist system users in setting up operations at a new site and/or reconfiguring operations at an existing site. For example, the database associations may assist system users in selecting the number, type, location, and/or operating mode of one or more base units 01, sensors and sensor arrays 20, 23, 24, 424, peripherals 30, and/or other connected system components.

Act 906 may further include generating a model of the site or sites based on the information received in acts 904-906. In one embodiment, the tailored data is received and/or accessed pursuant to one of the database selection methods depicted in FIGS. 11A-11C, however the analytic system may receive and/or access data used to perform event prediction via an alternate method or source. At act 908, the analytic system uses the site configuration data received and/or accessed during act 904 and the tailored data received and/or accessed during act 906 to determine one or more parameter thresholds corresponding to one or more events and/or preliminary events. A preliminary event may be an event that may be indicative of a potential or imminent occurrence of an undesirable or important event. For example, a preliminary event may be an increase in temperature beyond a certain threshold, which may be indicative of an increased likelihood of a possible fire. In some embodiments, an event or preliminary event may be indicated by a plurality of parameter thresholds instead of a single parameter threshold.

At act 910, the analytic system receives monitoring data from the one or more sensors at the one or more sites. At act 912, the system compares the data received during the previous step to the parameter thresholds determined during act 908 to determine whether an event is in progress. Analytic system comprises a memory that stores associations between certain types or configurations of parameter thresholds and certain events or, in some embodiments, preliminary events.

In some embodiments, the event prediction and response system 900 further comprises the ability to detect preliminary or suspected events. If an event is not detected, the system proceeds to act 916 to determine whether a preliminary event is in progress based on stored associations between monitoring data and various preliminary event types. If a preliminary event is not detected, the system resets, pauses, repeats or otherwise continues with its current programming depending on the desired embodiment. If the system detects a preliminary event, at act 918 the system may issue a preliminary event alert and/or take responsive action. For example, in some embodiments the system may be coupled to one or more actuators 30 capable of controlling the operating mode of one or more fans disposed near one or more heaters at the site being monitored. If a preliminary event is detected suggesting that cold conditions are approaching, then at act 918 the system may take proactive/corrective action by controlling the one or more actuators 30 to turn ON or increase the speed of the one or more fans located near the heaters in order to disperse heat at the site more effectively. A preliminary event alert may comprise any form of alert, notification, or communication with an external user or entity, for example, mobile user 05, desktop user 06, or other type of user or entity.

In some additional embodiments, at act 920 the system may actively monitor and/or change the configuration, power, or other settings of one or more sensors or related components and systems. In addition to storing associations between certain types or configurations of parameter thresholds and certain preliminary events, analytic system may also store associations between certain preliminary events and certain events. Analytic system may store additional associations between certain parameter thresholds and certain events responsive to the one or more events being associated with the preliminary event at issue. Using these associations, the analytic system can alter the programming of the monitoring system to prioritize detection of the associated events. In some embodiments, the system may also use the associations to perform additional or different response measures at the one or more sites being monitored.

In one embodiment, detecting a preliminary or suspected event 916 involves using one or more infrared sensors to map a gradient of infrared light intensity, power, energy, or a related property. Responsive to one or more infrared light properties meeting or exceeding one or more thresholds the determination that a preliminary event has occurred can be made and a preliminary alert or responsive action may be issued (act 918) corresponding to the type of preliminary event involved.

At act 920, the system may change an operating mode or characteristic of one or more base units, servers, handsets, sensors, actuators, and/or other system components responsive to the detection of a preliminary event during act 916. For example, the system may change the frequency at which the central controller and/or base unit reads or analyzes sensor data. In some embodiments, the system may change the frequency at which a sensor or sensors receive or transmit new data, or the conditions under which a sensor or sensors receive or transmit new data. In other embodiments, the system may change the power drawn by one or more base units or other system components. In other embodiments, the system may toggle whether one or more system components are in an ON state versus an OFF state. For example, if a preliminary event indicating a heightened risk of fire is detected, the system may activate, increase the refresh frequency of, or increase the power provided to one or more base units and/or sensors associated with fire detection.

In some embodiments, taking responsive action during acts 914 and/or 918 involves communicatively coupling one or more actuators, controllers, or other peripheral devices 30 to one or more base units. Each peripheral may be coupled to one or more objects, devices, or systems at the site or sites being monitored and may be configured to control one or more aspects of operation responsive to an event determination made during act 912 or a preliminary event determination made during acts 916, 920, and/or 922. For example, a base unit may be communicatively coupled to a valve actuator disposed in a fluid pipe and configured to control the operation of said valve responsive to detection of a fire event. Said actuators may be disposed within a base unit or outside of a base unit depending on the desired configuration and type of actuator. Base units may be further configured to control the operation of various types of on-site equipment including lighting, fans, heating, humidifiers, dehumidifiers, and/or other controllable equipment or fixtures disposed in, on, or around the site(s) being monitored.

In other embodiments, taking a responsive action at acts 914 and/or 918 involves automatically taking corrective or preventive action to ensure that damage or risk from an event is minimized or avoided altogether. For example, if a motion sensor detects an event or preliminary event corresponding to a suspected intruder, the system may be automatically configured to activate one or more lights around the site to deter or scare off the intruder prior to initiating a full alarm or other response. In another example, if a temperature sensor detects a frozen pipe, the system may be automatically configured to determine whether increasing the operation of one or more heaters would be sufficient to unfreeze the pipe and initiate the necessary operation of said heaters in response.

In various embodiments, the system may generate a written, audiovisual, or partially written and partially audiovisual report responsive to the detection, suspicion, and/or conclusion of an event and/or preliminary event. Some examples of a hybrid written-audiovisual report are depicted in FIG. 8. The generation of such a report may occur during any of acts 902-924.

Figure 10:
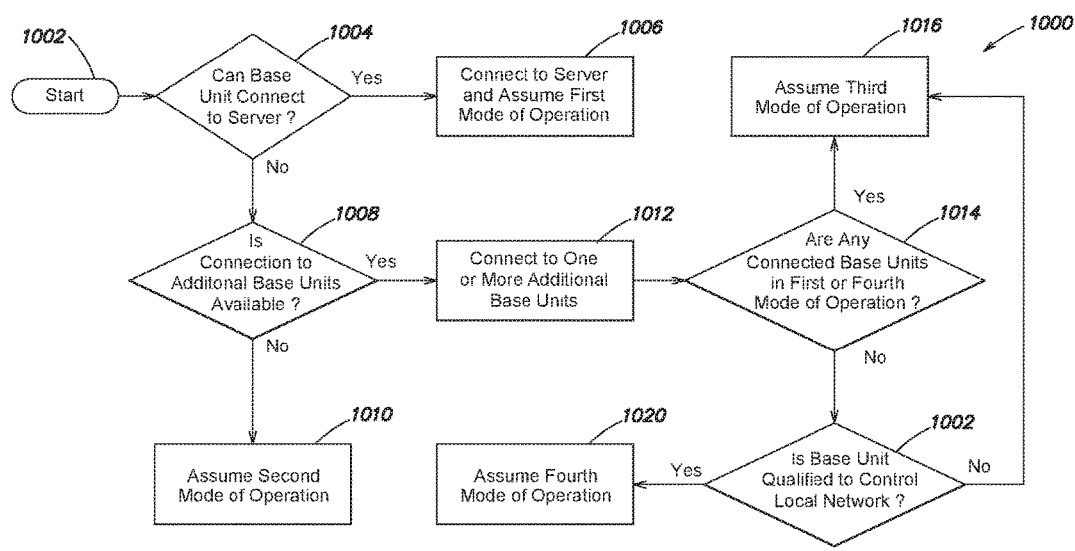
FIG. 10 shows a flowchart describing an embodiment of a method of base unit network configuration.

FIG. 10 depicts a flowchart of one embodiment of a method 1000 for configuring a network of base units 01 within a monitoring system as disclosed herein. The method begins at act 1002. At act 1004, a base unit determines whether it can connect to the server 04 either directly or via a router, gateway, or other wired or wireless mode of communication known to those in the art. If so, at act 1006 the base unit assumes a first mode of operation. If not, in some embodiments the system may proceed directly to act 1010 and assume a second mode of operation. In other embodiments, the base unit proceeds to act 1008 and determines whether any connections to additional base units or other networked devices are available. If so, at act 1012 the base unit connects to the one or more additional base units or other networked devices. In some embodiments, the base unit may proceed directly to act 1016 or 1020 and assume a third or fourth mode of operation, respectively.

In other embodiments, at act 1014 the base unit may determine whether any of the additional base units are currently in a third or fourth mode of operation and responsively assume either the third or fourth mode of operation. In other embodiments, at act 1018, responsive to determining that one or more of the additional base units is or is not in a third or fourth mode of operation, the base unit may determine whether the one or more additional base units is qualified, capable, or configured to control a local network of base units. In act 1020, responsive to the determination in act 1018, the base unit may enter a mode of operation in which it controls a local network of base units. In act 1016, responsive to a determination in act 1018 that it is not qualified, capable, or configured to control a local network of base units, the base unit may enter a mode of operation in which it does not control a local network of base units. The local network may be wired, wireless, or both and may take on any number of different architectures known to those in the art including, but not limited to, P2P and mesh configurations. For example, in a third mode of operation the base unit may be configured to function in a local network of base units wherein a different base unit has been designated as the leader or master. In some embodiments, entering a fourth mode of operation involves the base unit assuming control of a local network of multiple base units. In other embodiments, entering a first mode of operation involves the base unit connecting to a server capable of controlling the monitoring system. In other embodiments, entering a second mode of operation involves the base unit operating autonomously without connecting to a server, additional base unit, or other system control device.

Figure 11A:
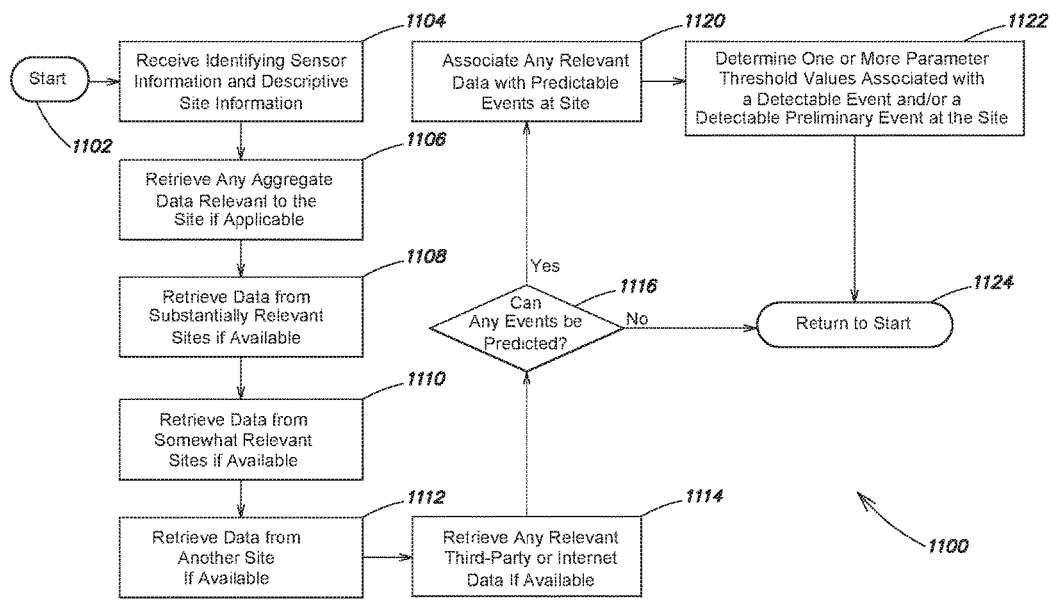
FIG. 11A shows a flowchart describing an embodiment of a method of detecting or retrieving information via an analytic system disclosed herein that is relevant to a site or sites being monitored.
Figure 11B:
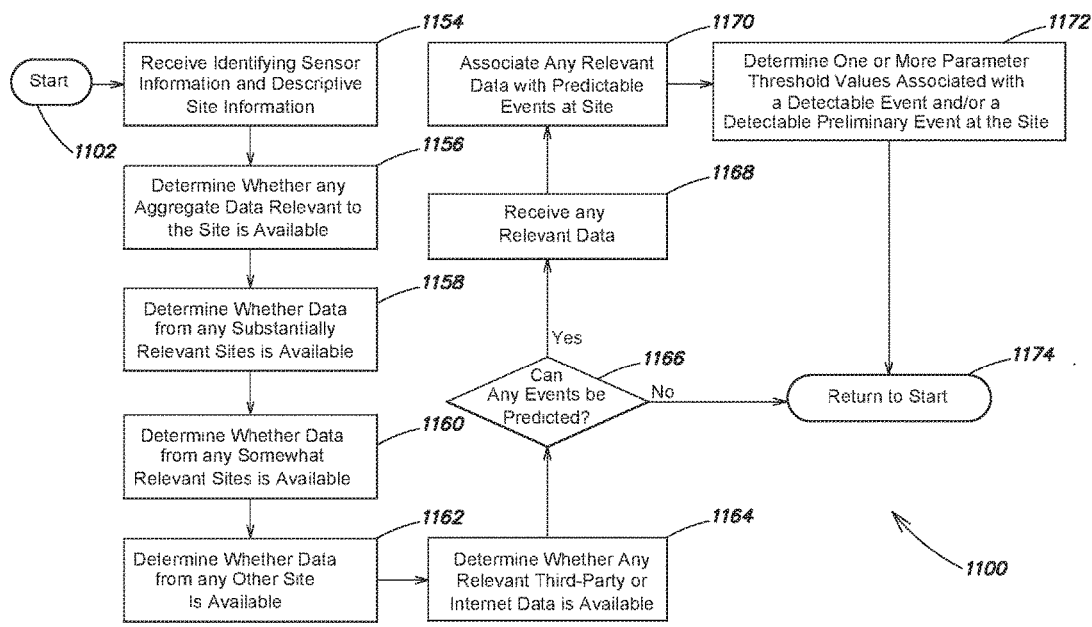
FIG. 11B shows a flowchart describing another embodiment of a method of detecting or retrieving information via an analytic system disclosed herein that is relevant to a site or sites being monitored.

FIGS. 11A and 11B depict flowcharts of embodiments of methods 1100 for detecting and/or retrieving information used to perform event prediction, response, and reporting as is described, for example, in FIG. 7-9, or for another purpose involving data being detected or retrieved in accordance with the present disclosure.

FIG. 11A depicts a flowchart of an embodiment of a method for detecting and retrieving data relevant to a site or sites being monitored. The method begins at act 1102. In one embodiment, at act 1104 the analytic system receives information identifying the locations and types of sensors operating at a site or sites being monitored. At act 1106, the system receives any available aggregate data relevant to the site or sites being monitored. Aggregate data may comprise preconfigured libraries or databases tailored to particular types of sites or sensor arrangements or drawn from a plurality of external sites or sources. Aggregate data may comprise data that has been previously processed or manipulated to consolidate or extrapolate important values in advance of retrieval.

At act 1108, the system retrieves any available data from a substantially relevant site. A substantially relevant site may comprise a site possessing a similar floorplan, located in a similar environment, managed by the same owner, having the same general contractor or subcontractor, being the same building type, possessing a similar sensor configuration or risk of exposure to certain events, or any other source of similarity that increases the likelihood that the site's information will be relevant to the site being monitored. At act 1110, the system can widen its search to retrieve data from additional sites that are relevant to the site or sites being monitored, but to a lesser degree than sites identified in act 1108. At act 1112, the system can further widen its search to retrieve data from additional sites which were not sufficiently relevant to be included during acts 1108 or 1110. Lastly, at act 1114 the system retrieves any other relevant data it can find from external sources not necessarily associated with site data, for example, data found on the Internet, industrial or scientific data, data sourced from partner companies, weather prediction data, data owned or possessed by third-parties, and/or other sources of data relevant to determining events and associated parameter thresholds at the site being monitored.

After receiving the data of acts 1104-1114, at act 1116 the system determines whether it can generate prediction values for any events or preliminary events at the site or sites being monitored based on the data received. If not, the system can proceed to act 1124 and restart the process when desired. If so, the system can proceed to act 1120 or, in some embodiments, directly to act 1122. At act 1120 the system proceeds to determine one or more events or preliminary events the system is capable of monitoring, detecting, or predicting at the site or sites being monitored based on the data received in acts 1104, 1006, 1008, 1110, 1112, and/or 1114. At act 1122, the system uses the determinations made in the previous act to determine one or more parameter threshold values corresponding to each event or preliminary event.

FIG. 11B depicts an alternate embodiment of the method for detecting and retrieving data relevant to a site or sites being monitored. Acts 1154, 1156, 1158, 1160, 1162, and 1164 are similar to acts 1104, 1106, 1108, 1110, 1112, and 1114 described in FIG. 11A, respectively, however, instead of retrieving the data involved in each act, the system accesses all or part of the data without downloading said data in its entirety and responsively determines whether the accessed data possesses the desired degree of relevance to the site or sites being monitored. For example, the system may receive metadata, index, or summary information describing the data, parse through all or part of the data in memory without downloading the entirety of said data to memory, or perform some other action that allows it to analyze the relevance of the data to a particular site or sites without using as much bandwidth, power, processing capability, or other resource associated with the analytic system as compared to the embodiment illustrated in FIG. 11A.

After determining the availability of any data in acts 1154-1164, at act 1166 the system determines whether it can generate prediction values for any events or preliminary events at the site or sites being monitored based on the data. If not, in some embodiments the system can proceed to act 1174 and restart the process when desired. If so, at act 1168 the system retrieves some or all of the data determined to be available. At act 1170 the system proceeds to associate particular data with particular events or preliminary events.

At act 1172, the system uses the associations made in the previous step to determine one or more parameter thresholds or patterns corresponding to each event or preliminary event.

In various embodiments of the methods illustrated in FIGS. 11A and 11B, the system may skip any or all of acts 1106-1114, 1156-1164 depending on the desired configuration. In the case of FIG. 11A, the system may proceed directly from any of acts 1104, 1106, 1108, 1110, 1112, or 1114 to act 1116 depending on the desired configuration. In the case of FIG. 11B, the system may proceed directly from any of acts 1154, 1156, 1158, 1160, 1162, or 1164 to act 1166 depending on the desired configuration.

Figure 12:
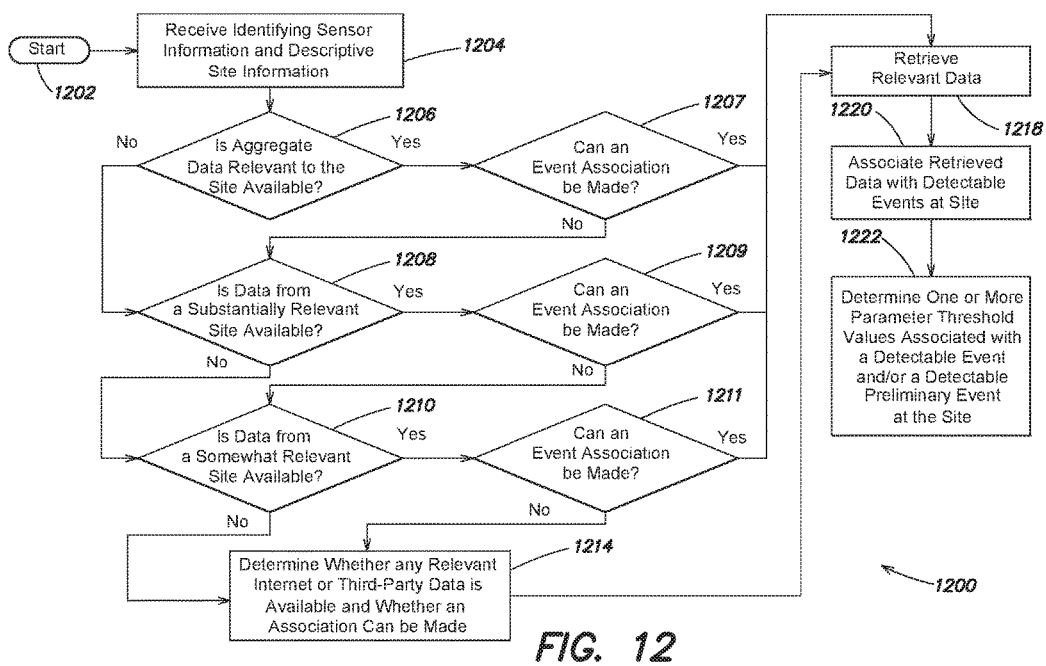
FIG. 12 shows a flowchart describing another embodiment of a method of detecting or retrieving information via an analytic system disclosed herein that is relevant to a site or sites being monitored.

FIG. 12 describes another embodiment of a method for detecting and retrieving data relevant to a site or sites being monitored. Acts 1206, 1208, and 1210 operate similarly to acts 1156, 1158, and 1160 in FIG. 11B, respectively. However, if the system determines that there is relevant data at any of acts 1206, 1208, or 1210 it proceeds directly to one of acts 1207, 1209, or 1211, respectively, each of which operate similarly to acts 1116, 1166 in FIGS. 11A and 11B, respectively. If an event association can be made at that time or if the system has already reached act 1214, the system proceeds to act 1218, which functions similarly to act 1168 in FIG. 11B. If no event association can be made at act 1207, 1209, or 1211, the system instead proceeds to one of act 1208, 1210, or 1214, respectively. Acts 1220 and 1222 function similarly to respective acts 1170 and 1172 shown in FIG. 11B.

Figure 13:
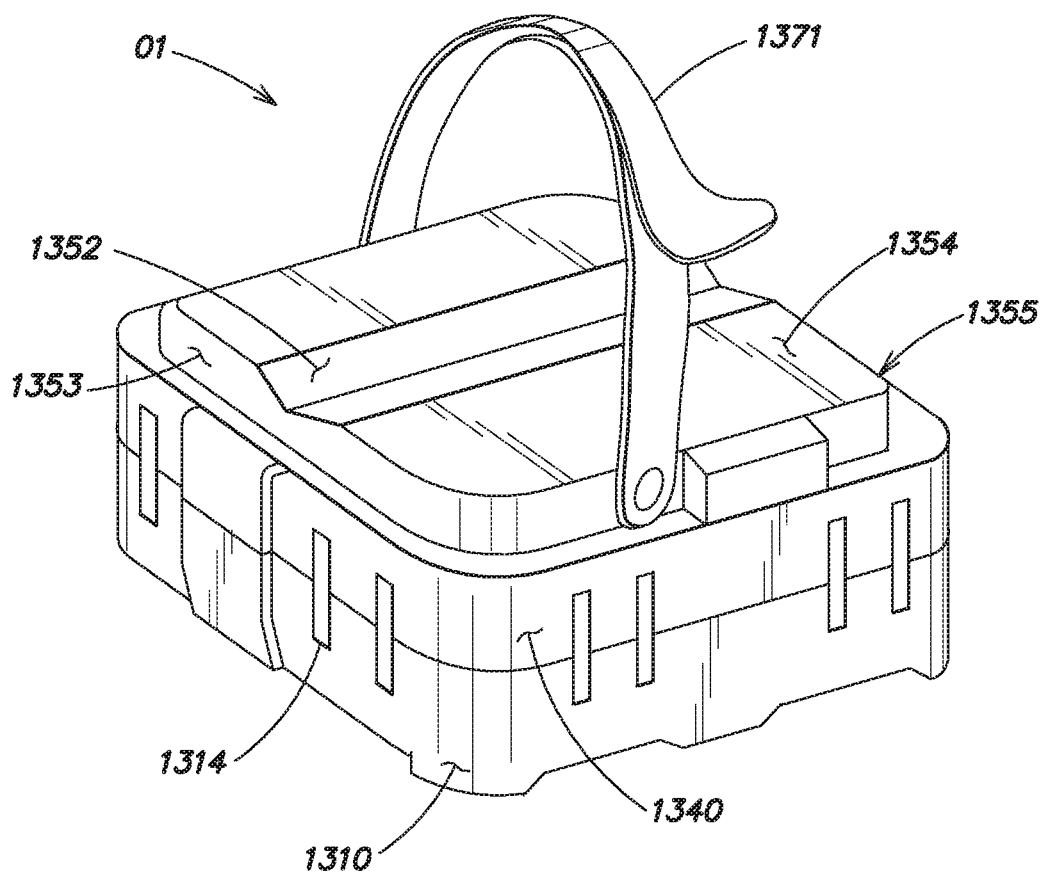
FIG. 13 shows an illustrative view of an embodiment of a base unit.

FIG. 13 illustrates another embodiment of a base unit 01. Base unit 01 may have a front housing plate 1310 covering the front surface and part of the lateral surfaces. Front housing plate 1310 may also contain any or all of the features described herein with respect to front housing surface 310 in FIG. 3A. Base unit 01 may further have a rear housing plate 1340 covering the rear surface and all or part of the remaining lateral surfaces not covered by front housing plate 1310. In some embodiments, the lateral portions of front housing plate 1310 may abut all or part of the lateral portions of rear housing plate 1340. Rear housing plate 1340 may also contain any or all of the features described herein with respect to rear housing surface 340, lateral housing surface 320, and/or lateral housing segments 322 and 323 as depicted in FIG. 3A.

In some embodiments, a base unit 01 may further comprise one or more secondary apertures 1314. A secondary aperture 1314 may, for example, function as a vent or filter to allow and/or restrict various types or quantities of air or other gasses, particulates, and/or moisture from entering the base unit 01 similar to the apertures 311. Secondary aperture 1314 may further be covered by, fitted with, or integral with one or more secondary aperture gratings similar to sensor aperture gratings 312 depicted in FIGS. 3A and 3B.

In some embodiments, a base unit 01 may further comprise a set of secondary housing surfaces 1355 that are not flush with the other housing surfaces or plates disclosed herein. The set of secondary housing surfaces 1355 may abut and/or be fixedly attached to one or more of the other housing surfaces described herein. For example, a secondary lateral housing plate 1353 may abut and be fixedly attached to rear housing plate 1340. A secondary rear housing surface 1354 is pictured in FIG. 13, however the set of secondary housing surfaces 1355 may comprise any shape and combination of front, lateral, or rear surfaces, plates, segments, and edges disclosed herein in FIGS. 3A-3D. A V-groove or U-groove 1352 may be shaped into and/or carved out from the any or all of the front, lateral, or rear surfaces, plates, segments disclosed herein in FIGS. 3A-3D and adapted to allow the base unit 01 to better engage a secondary surface or object, for example, a pipe. For example, a V-groove or U-groove 1352 may be shaped into and carved out of secondary rear housing surface 1354 and secondary lateral housing plate 1353, respectively. A mounting strap 1371 may be further attached to one or more housing surfaces, plates, segments, and/or edges and adapted to fixedly mount the base unit 01 on a secondary object or surface, for example, a pipe.

Figure 14:
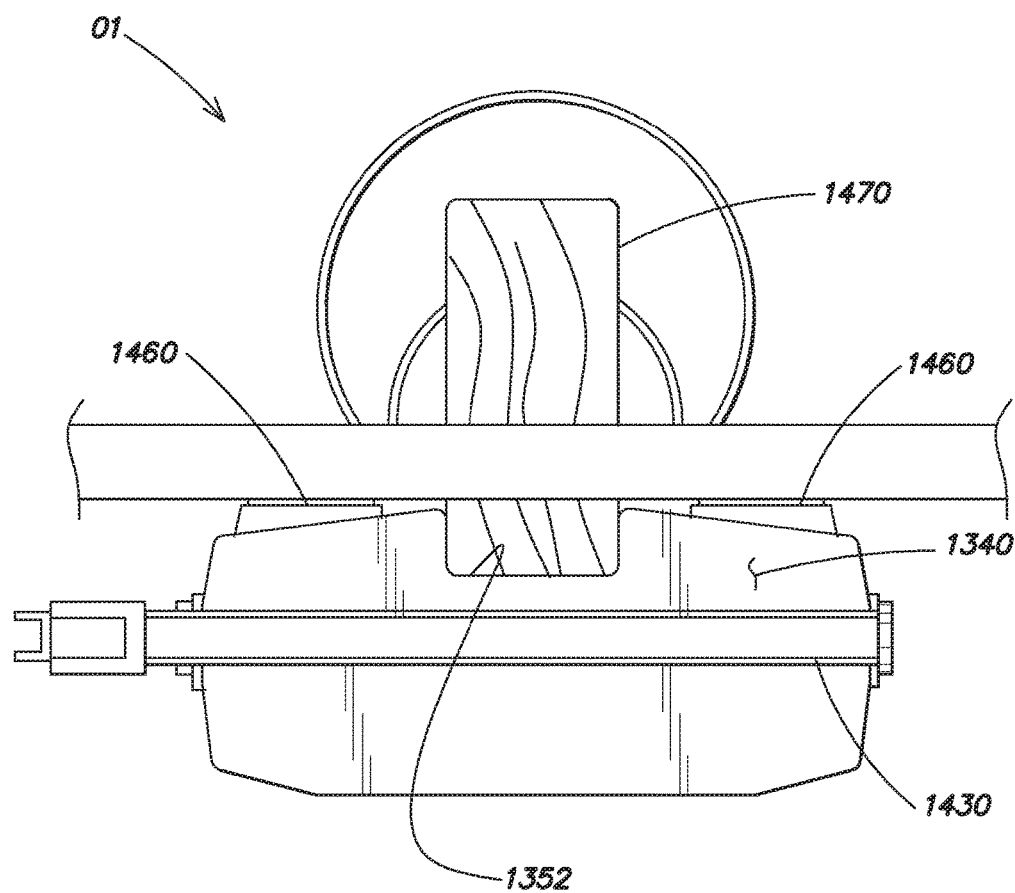
FIG. 14 shows an illustrative view of an embodiment of a base unit.

FIG. 14 illustrates another embodiment of a base unit 01. In some embodiments, magnet mounts 1460 may be attached a housing surface, such as rear housing plate 1340, to allow for the base unit to be mounted to ferrous material. During magnetic mounting scenarios, a detachable strap 1430 may be located on the lateral face of base unit, or on or along other faces of the base unit depending on the desired configuration. A V-groove or U-groove 1352 may be carved out of secondary rear housing surface and sized specifically to receive a secondary mounting piece 1470. For example, the U-groove 1352 may be sized to accommodate a 2×4 piece of wood to provide for a more stable and rigid mounting. V-groove or U-groove 1352 may also be sized and shaped to interface with a variety of other surfaces and/objects, for example, pipes instead of a 2×4. Detachable strap 1430 may be detachable from the lateral face of the base unit, and able to be pulled around the 2×4 or pipe to hold securely during a horizontal or vertical mounting scenario.

Figure 15:
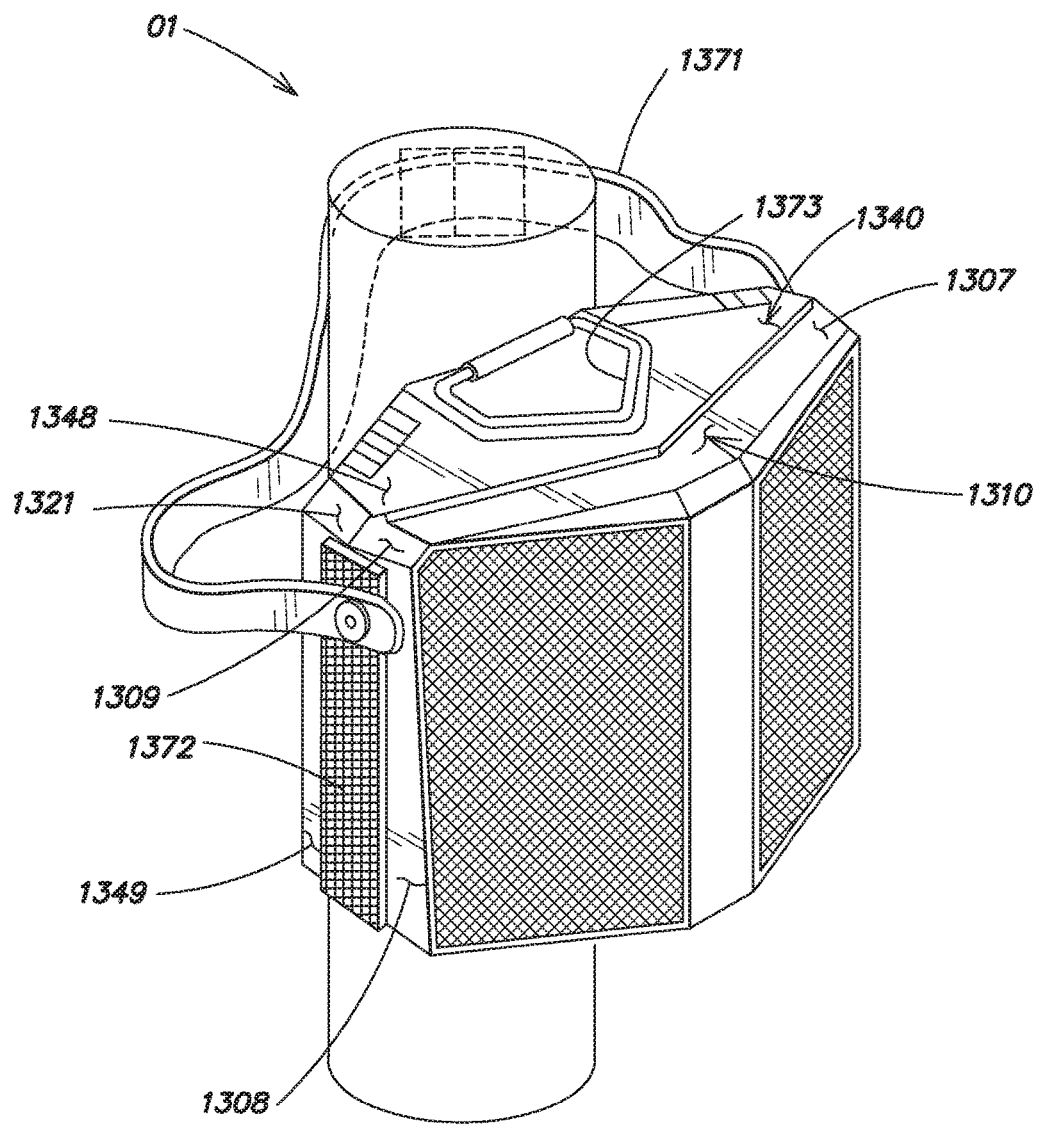
FIG. 15 shows an illustrative view of an embodiment of a base unit.

FIG. 15 illustrates another embodiment of a base unit 01. In some embodiments, front housing plate 1310 may be segmented into one or more front housing plate segments, for example, elements 1307 and 1308, each which may be separated by one or more corresponding front housing plate vertices 1309. Front housing plate segments 1307, 1308 may be integral with or abut each other and/or each respective front housing plate vertex 1309. One or more pieces of webbing 1372 may be fixedly attached to any or all of the surfaces, plates, segments, edges, and vertices described herein. In some embodiments, some or all of the webbing 1372 may be adapted to be reflective making the base unit 01 easier to identify. Rear housing plate 1340 may be segmented into one or more rear housing plate segments, for example, elements 1348 and 1349, each which may be separated by one or more corresponding rear housing plate vertices 1321. Rear housing plate segments 1348, 1349 may be integral with or abut each other and/or each respective rear housing plate vertex 1321. In various embodiments, each rear housing plate 1340, rear housing plate segment 1348-1349, and/or rear housing plate vertex 1321 may be integral with, abut, be flush with or offset from, or otherwise be disposed proximate to each corresponding front housing plate 1310, front housing plate segment 1307-1308, and/or front housing plate vertex 1309 in accordance with a desired shape or configuration. In various embodiments, one or more mounting hooks 1373 may each be fixedly attached to one or more portions of the base unit's housing and configured to allow the base unit to hang from an object, for example, a screw or a nail, or a surface disposed on or around the site being monitored. Mounting strap 1371 functions similarly to the mounting strap 1371 disclosed in FIGS. 13 and 17.

Figure 16:
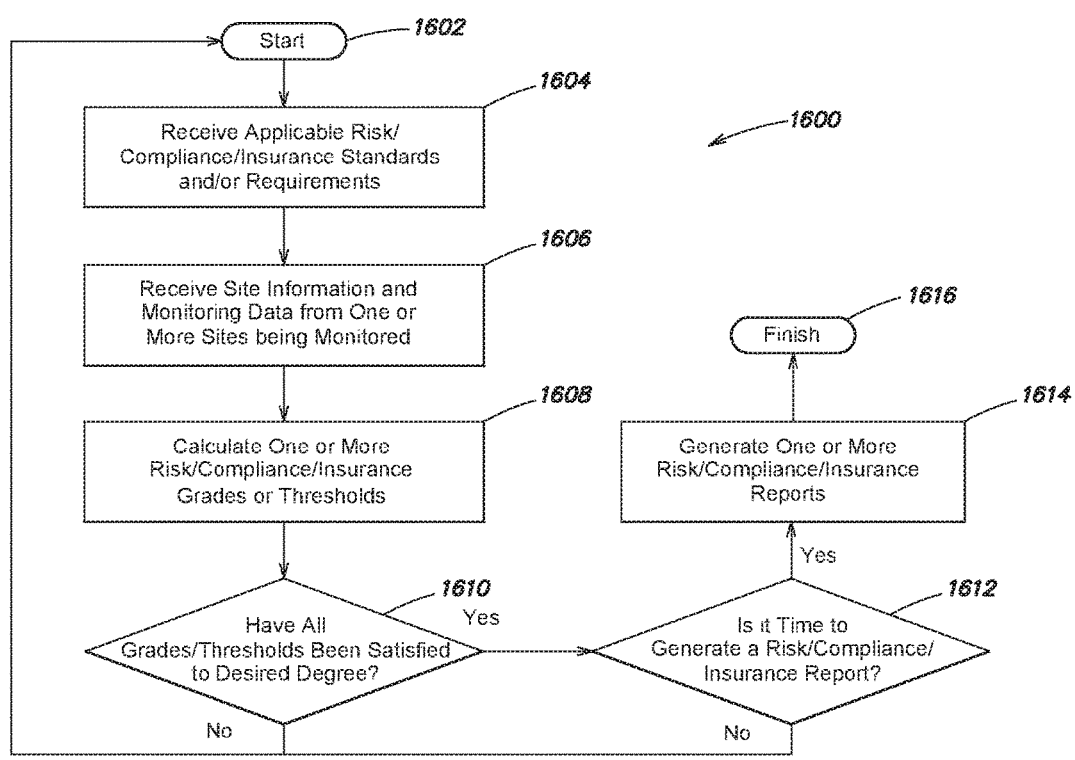
FIG. 16 shows a flowchart describing an embodiment of a method for determining an extent to which one or more sites being monitored are in compliance with one or more insurance or regulatory requirements and/or parameters.

FIG. 16 depicts a flowchart of one embodiment of a method 1600 for determining, by one or more server or controller of the monitoring system disclosed herein, an extent to which one or more sites being monitored are in compliance with one or more insurance or regulatory requirements and/or parameters. The system begins at act 1602. At act 1604, the system receives applicable insurance or compliance requirements associated with a site or sites being monitored. At act 1606, the system receives applicable site configuration and/or monitoring data. At act 1608, the system calculates one or more compliance grades or thresholds based on the information received during acts 1604 and 1606. For example, noise levels or vibration levels may be summarized to be reported, or room occupancy data may be summarized to be reported in accordance with contractor safety programs.

In some embodiments, the system may proceed directly to acts 1614 or 1616, or return to act 1602 at a desired interval or schedule, or responsive to one or more conditions. In other embodiments, the system proceeds to act 1610 and determines whether one or more grades or thresholds derived in act 1606 has been satisfied to a certain degree. If not, the system may proceed directly to acts 1614 or 1616, or returns to act 1602 at a desired interval or schedule, or responsive to one or more conditions. If so, the system proceeds to act 1612 and determines whether it is time to generate one or more alerts and/or reports based on the results of act 1610. If not, the system may proceed directly to act 1616 or return to act 1602 at a desired interval or schedule, or responsive to one or more conditions. If so, the system proceeds to act 1614 and generates one or more alerts and/or reports based on the results of act 1610. For example, the system may generate an report which summarizes the real-time risk over a period of time, an report detailing conditions during an installation, or a contractor safety program compliance report. The method finishes at act 1616.

In some embodiments, at some point between acts 1610 and 1616 the system may further be configured to save some or all of the information collected in acts 1608 and/or 1614 as part of a compliance or risk profile. The system may save this information in a historical archive of profiles for later use. The archived profile information may be accessed again during act 1604 to inform the subsequent compliance grades or thresholds generated during act 1608, or again at act 1614 to inform subsequent compliance reports.

Figure 17:
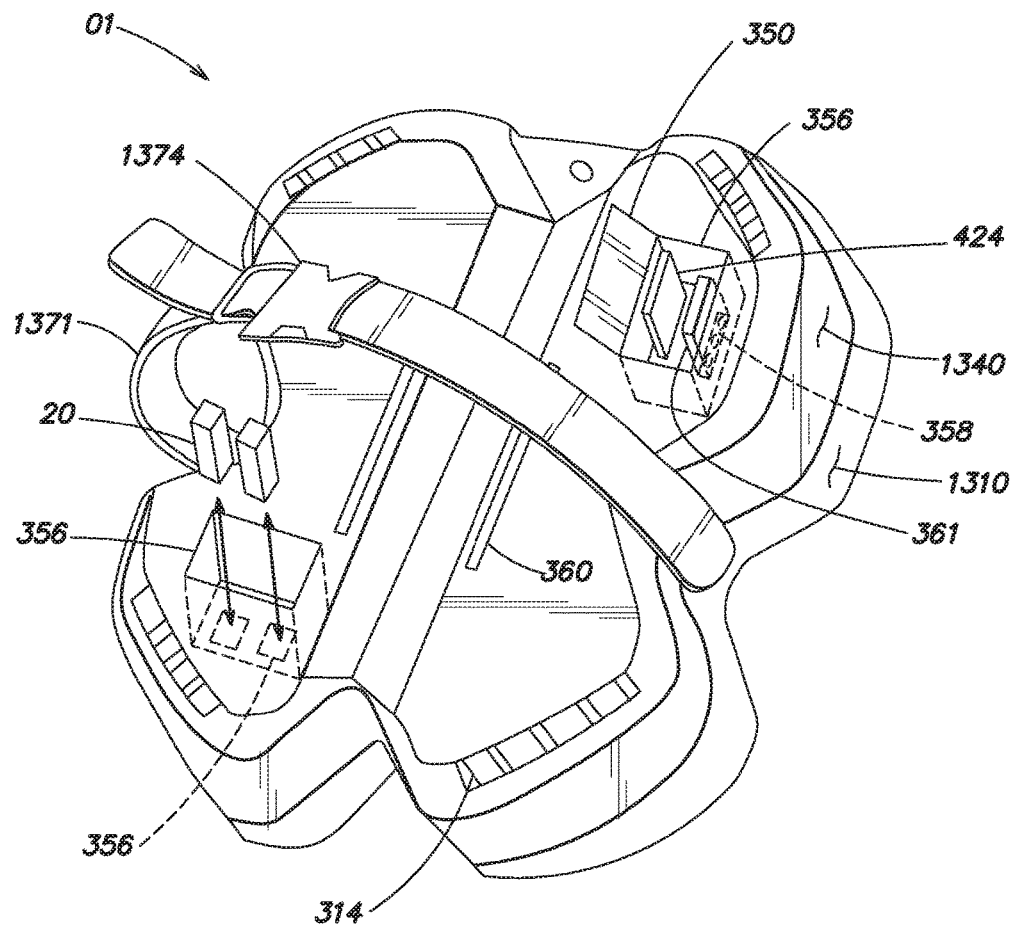
FIG. 17 shows an illustrative view of an embodiment of a base unit.

FIG. 17 illustrates another embodiment of a base unit 01. One or more cavities 356 may be disposed within or underneath a portion of a housing surface, housing surface segment, housing plate, housing plate segment, edge, vertex, or other exterior portion of a base unit as disclosed herein. A cavity may be removably covered by a hatch, cover, seal, cap, slide door, and/or other closing mechanism 350 known to those in the art. Each cavity 356 may contain one or more sensor interfaces or ports 358 for communicatively coupling and/or removably securing a sensor 20 or sensor array 424. In some embodiments, unused sensor interfaces 358 may be covered by a sensor interface cover 361.

In some embodiments, a plurality of mounting pieces 360 may be on disposed on a portion of a housing surface, housing surface segment, housing plate, housing plate segment, edge, vertex, or other exterior portion of a base unit as disclosed herein. For example, the plurality of mounting pieces 360 may each comprise a magnet and/or adhesive patch. Mounting strap 1371 functions similarly to the mounting strap 1371 disclosed in FIGS. 13 and 15, and may further include a releasable and/or adjustable fastener 1374, such as a clip, hook-and-loop fastener, tie, or other such fastening means known to those in the art.

In some embodiments, one or more secondary apertures 314 may be on disposed on or within a portion of a housing surface, housing surface segment, housing plate, housing plate segment, edge, vertex, or other exterior portion of a base unit as disclosed herein. Any or all of the secondary apertures 314 may be covered by a grating, webbing, filter, mesh, seal, cover, etc.

Figure 18:
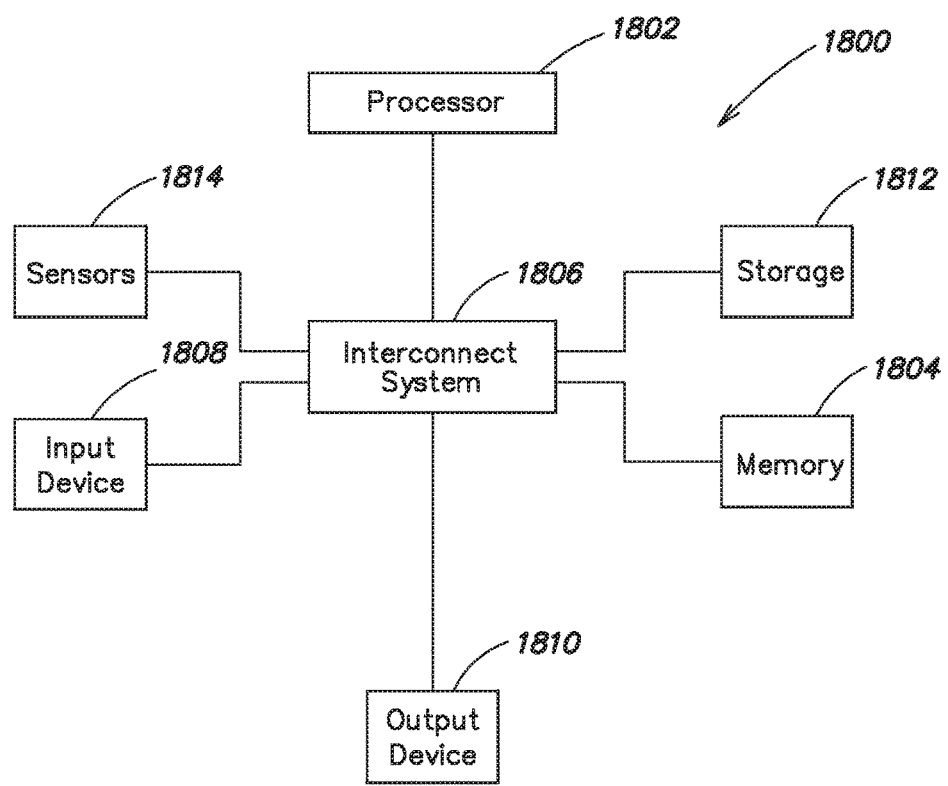
FIG. 18 illustrates components of a computer system upon which various methods disclosed herein may be performed.

Various aspects of the one or more controllers 18 or server 04 may be implemented as specialized software executing in a general-purpose computer system 1800 such as that shown in FIG. 18. The computer system 1800 may include a processor 1802 connected to one or more memory devices 1804, such as a disk drive, solid state memory, or other device for storing data. Memory 1804 is typically used for storing programs and data during operation of the computer system 1800. Components of computer system 1800 may be coupled by an interconnection mechanism 1806, which may include one or more busses (e.g., between components that are integrated within a same machine) and/or a network (e.g., between components that reside on separate discrete machines). The interconnection mechanism 1806 enables communications (e.g., data, instructions) to be exchanged between system components of system 1800. Computer system 1800 also includes one or more input devices 1808, for example, a keyboard, mouse, trackball, microphone, touch screen, and one or more output devices 1810, for example, a printing device, display screen, and/or speaker. In addition, computer system 1800 may contain one or more interfaces (not shown) that connect computer system 1800 to a communication network in addition or as an alternative to the interconnection mechanism 1806.

Figure 19:
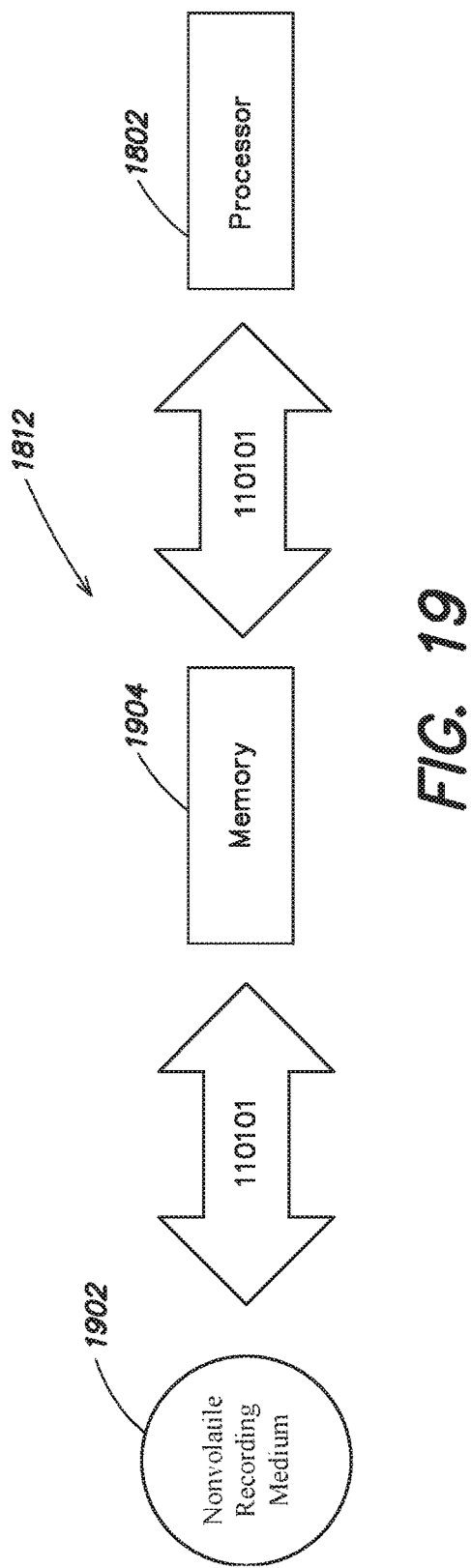
FIG. 19 illustrates details of an embodiment of a memory system for the computer system of FIG. 18.

The storage system 1812, shown in greater detail in FIG. 19, typically includes a computer readable and writeable nonvolatile recording medium 1902 in which signals are stored that define a program to be executed by the processor 1802 or information to be processed by the program. The medium may include, for example, a disk or flash memory. Typically, in operation, the processor causes data to be read from the nonvolatile recording medium 1902 into another memory 1904 that allows for faster access to the information by the processor than does the medium 1902. This memory 1904 is typically a volatile, random access memory such as a dynamic random access memory (DRAM) or static memory (SRAM). It may be located in storage system 1812, as shown, or in memory system 1804. The processor 1802 generally manipulates the data within the integrated circuit memory 1904 and then copies the data to the medium 1902 after processing is completed. A variety of mechanisms are known for managing data movement between the medium 1902 and the integrated circuit memory element 1904, and aspects and embodiments disclosed herein are not limited thereto. Aspects and embodiments disclosed herein are not limited to a particular memory system 1804 or storage system 1812.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although computer system 1800 is shown by way of example as one type of computer system upon which various aspects and embodiments disclosed herein may be practiced, it should be appreciated that aspects and embodiments disclosed herein are not limited to being implemented on the computer system as shown in FIG. 18. Various aspects and embodiments disclosed herein may be practiced on one or more computers having a different architecture or components that that shown in FIG. 18.

Computer system 1800 may be a general-purpose computer system that is programmable using a high-level computer programming language. Computer system 1800 may be also implemented using specially programmed, special purpose hardware. In computer system 1800, processor 1802 is typically a commercially available processor such as the well-known Pentium™, Core™, or Atom™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 100 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example, ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions).

Various aspects and embodiments disclosed herein may be implemented as programmed or non-programmed elements, or any combination thereof.

Figure 20:
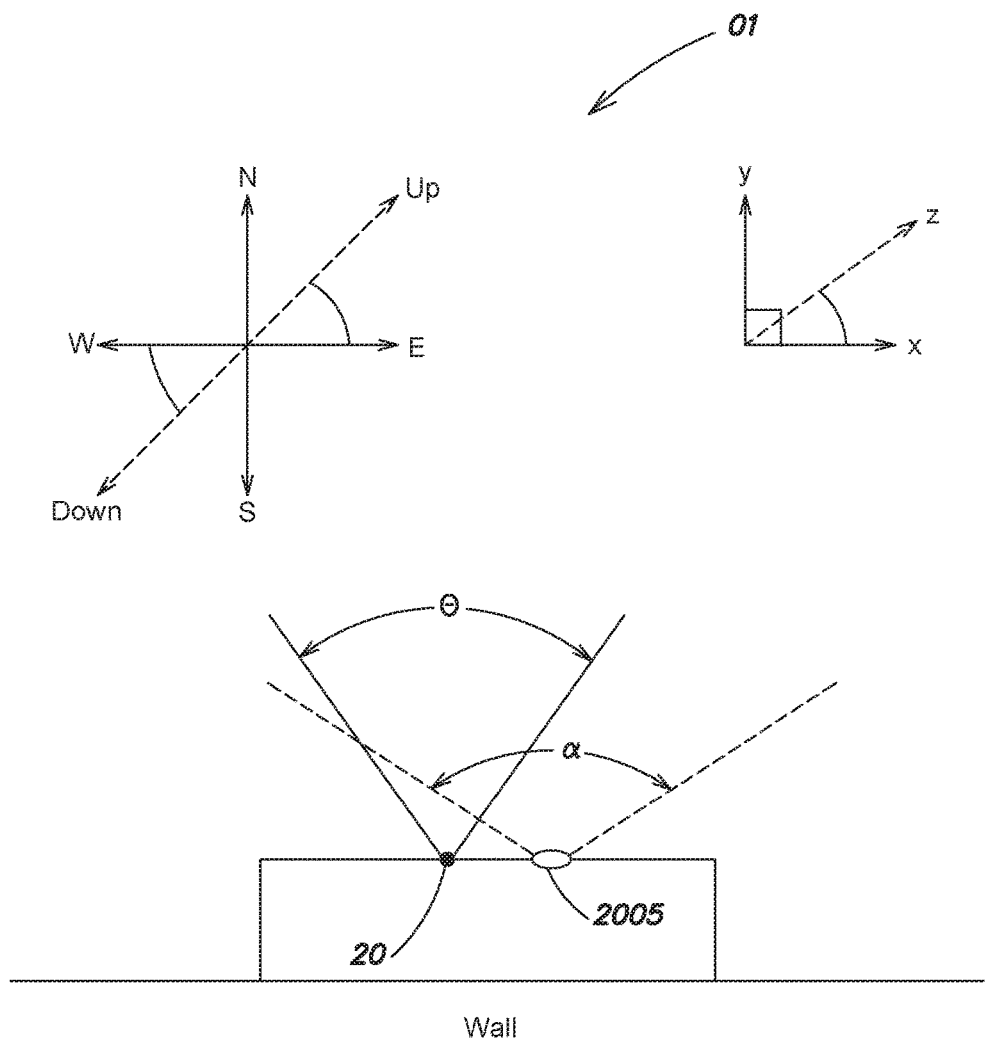
FIG. 20 shows an illustrative view of an embodiment of a base unit.

FIG. 20 depicts an additional embodiment of a base unit configured to detect its orientation and/or perform image processing using one or more cameras 2005 communicatively coupled to the one or more controllers 18 within the base unit 01. One or more sensors capable of detecting orientation and/or directional information, such as a magnetic sensor or accelerometer may be disposed in or communicatively coupled to the base unit 01 and provide an orientation of the base unit 01. For example, an accelerometer may use a three-dimensional Cartesian coordinate system x-y-z to detect a positive or negative force of gravity g acting on one or more of the axes x, y, and/or z. A magnetic sensor may be further configured to detect an orientation relative to geographic directions North, South, East, West, up, and/or down. The system may then associate the appropriate x-y-z directions with corresponding geographic directions North, South, East, West, up, and/or down. Using the information collected by the sensors and the known relationship between the coordinate system and geographic directions, the base unit may determine its current orientation.

An additional sensor 20 may have a range or area of detection that partially or completely overlaps a range or area of detection corresponding to the one or more cameras 2005. For example, an IR sensor 20 may have a cone of detection with an angle θ and a camera 2005 may have a cone of detection with an angle α. If the IR sensor 20, for example, detects a sudden change in the thermal distribution within its cone of detection, then the system may be programmed to activate the camera 2005 in response and perform image processing on the images captured by the camera 2005 in order to identify the object or phenomenon that caused the thermal anomaly. In certain embodiments, the sensors 20 and/or cameras 2005 involved may instead be configured as standalone external sensors 23 or external peripherals 30, respectively, while still being communicatively coupled to at least one base unit 01.

Figure 21A:
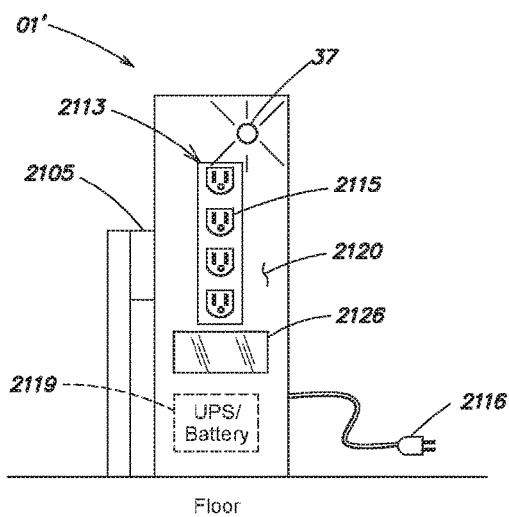
FIG. 21A shows an illustrative view of an embodiment of a base unit.
Figure 21B:
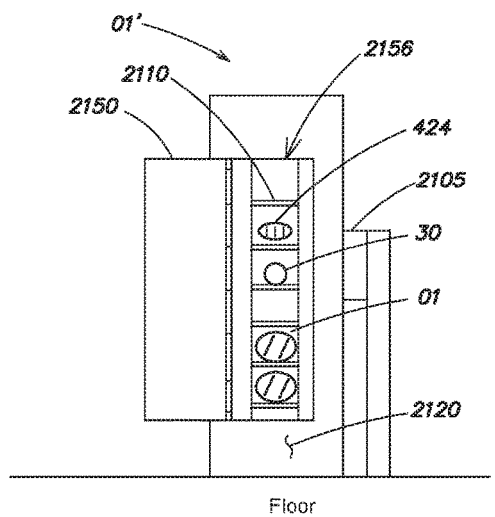
FIG. 21B shows an additional view of the base unit of FIG. 21A.

FIGS. 21A & 21B depict two opposing lateral perspectives of an embodiment of a base unit configured to function as a power pillar 01'. The power pillar 01' is encased by a housing 2120 and receives power from an external power supply, for example, from site utility power outlet 2105. Power pillar 01' may further comprise one or more power port surface 2113 each containing one or more power ports 2115 for providing power to one or more external components. Power pillar 01' may also comprise one or more power cables 2116 (ending in a male or female power port) for connecting to site power outlets 2105. For example, if the power pillar 01' cannot be placed directly adjacent to a site power outlet 2105 then power cable 2116 may be used to connect to site power outlet 2105. Power cable 2116 may be partially or fully retractable into the body of the power pillar 01'. The power pillar 01' may further comprise one or more backup batteries and/or UPS devices 2119 for providing backup power to connected components. For example, battery backups and/or UPS devices 2119 may be configured to provide power to one or more connected components in the event that utility power is unavailable or compromised.

Power pillar 01' may also comprise one or more storage cavities 2156, which may each be removably sealed by a hatch 2150 or similar removable sealing apparatus known to those in the art. One or more storage racks or shelves 2110 may be disposed within each storage cavity 2156 and its position within the storage cavity may be removable or adjustable. Each storage cavity may removably contain one or more system components including base units 01, sensors 20, 23 or sensor arrays 24, 424, peripherals 30, and/or other system components to be used around the site being monitored. Storage cavities 2156 and racks 2110 may be used, for example, to removably contain some or all of the equipment to be used at a site when the system is first delivered or to removably store equipment that was already used at the site following the completion of monitoring operations at that site.

Power pillar 01' may further comprise one or more lights 37 for illuminating the site, indicating an alarm or other status information, or for performing other functions of a light known to those in the art. Power pillar 01' may also comprise one or more displays 2126 for visually displaying information, for example, an alarm, site location, or other system or site status information. A display may comprise a digital screen such as an LCD, LED, CRT, OLED, and/or other digital display device known to those in the art. A display 2126 may also function as a user interface (UI) 26 capable of receiving user input in addition to displaying information. A display 2126 that is also a UI 26 may be a resistive, capacitive, or infrared touchscreen or other user interface known to those in the art. For example, a user may interact with the display 2126 by pressing a request icon on the touchscreen and responsively bring up a map of the site with a status icon indicating their current location within the site.

Figure 22:
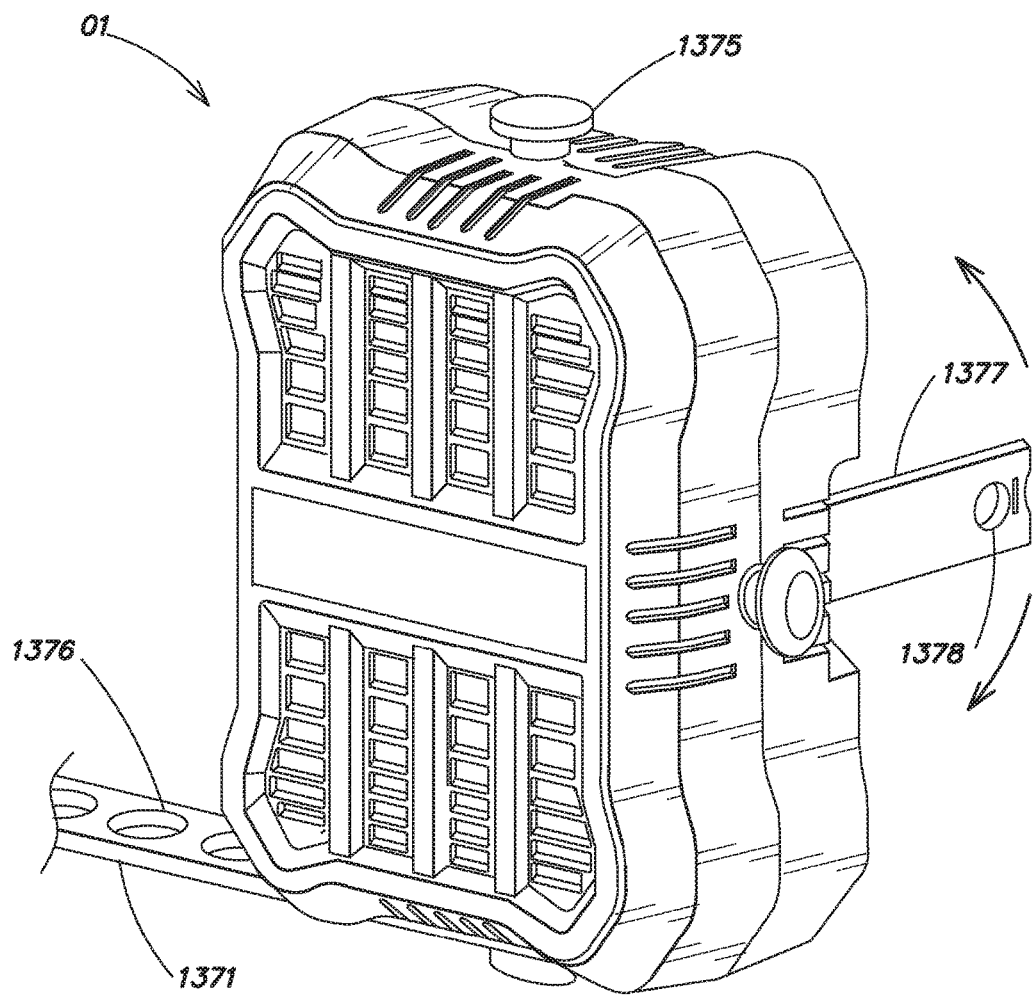
FIG. 22 shows an illustrative view of an embodiment of a base unit.

FIG. 22 is a perspective view of another embodiment of a base unit 01. The base unit 01 has an elastic mounting strap 1371 including a plurality of mounting strap apertures 1376 disposed along the mounting strap 1371. The base unit 01 further includes a plurality of bullhorns 1375 attached to and protruding away from one or more base unit surfaces, plates, segments, edges, and/or vertices. Since the mounting strap 1371 is made of an elastic material, the mounting strap apertures 1376 may be manually stretched allowing them to slide over and couple with each bullhorn 1375. The base unit 01 further includes a mounting clip 1377 hingedly attached to one or more base unit surfaces, plates, segments, edges, and/or vertices. In FIG. 22, mounting clip 1377 is depicted being hingedly attached to the rear housing surface.

Figure 23:
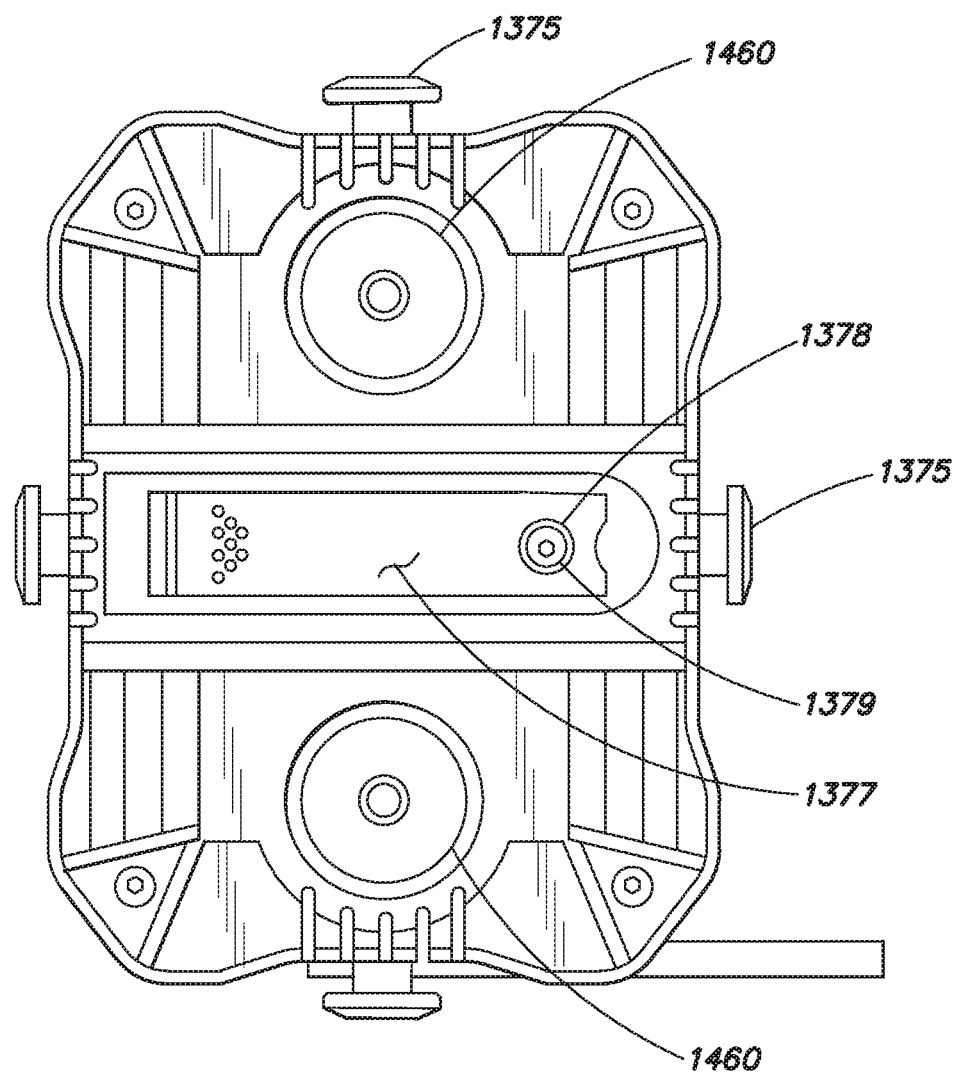
FIG. 23 shows an illustrative view of an embodiment of a base unit.

FIG. 23 is a rear view of the embodiment of a base unit 01 shown in FIG. 22. While not being used, the mounting clip 1377 can hingely retract inward such that it is substantially flush with the rear housing surface as shown in FIG. 23. When moved into the fully retracted position described above, a mounting clip aperture 1378 disposed near the end of the mounting clip 1377 can mate with a mounting clip tab 1379 and fix the mounting clip 1377 in the retracted position. One or more magnet mounts 1460 may be disposed on the rear housing surface, or on another surface or plate, of the base unit 01 as described above with respect to FIG. 14.

Figure 24:
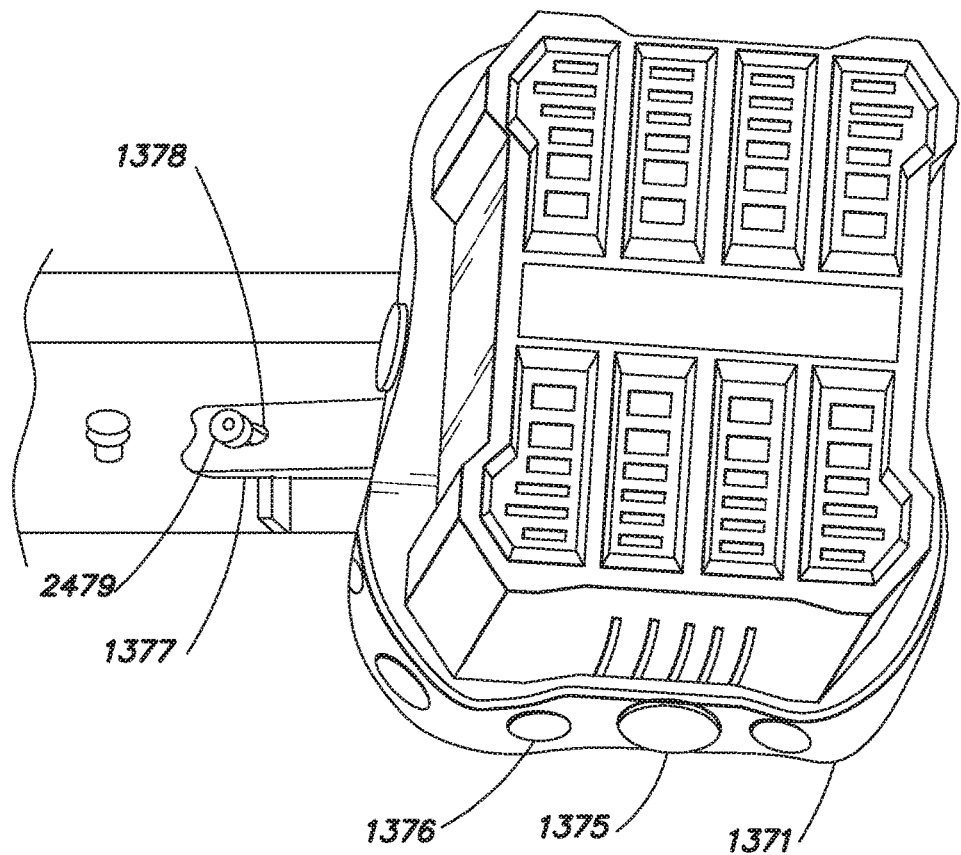
FIG. 24 shows an illustrative view of an embodiment of a base unit.

FIG. 24 is a perspective view of another embodiment of a base unit 01. A mounting strap 1371 is in an unused position and wraps around the lateral periphery of the base unit 01. The unused mounting strap 1371 is arranged in a storage position such that a plurality of mounting strap apertures 1376 disposed on the mounting strap 1371 are each wrapped around and coupled to a corresponding bullhorn 1375. A mounting clip 1377 is hingedly withdrawn away from the rear housing surface and coupled to a fixed protrusion 2479 via the mounting clip aperture 1378 such that the base unit 01 is secured in place by the fixed protrusion 2479.

Example 1

The following is an example of the monitoring system operating in accordance with a preferred embodiment of the present disclosure.

A construction site consisting of a basement and several above-ground floors is outfitted with a plurality of base units 01. A number of areas within the site contain magnetically-active metal structures and, in those areas, base units 01 are removably affixed to the structures using magnet mounts 360. In other areas, base units 01 are removable affixed to 2×4 pieces of wood via mounting straps 1371. A wireless networking gateway 32 is disposed near the spatial center of the site and allows the base units to wirelessly connect via LPWAN to the gateway 32 and provides access to a cellular data connection over 3G or 4G. The server 04 is hosted on the Internet and may be accessed using the cellular data connection.

The controller 18 in each base unit 01 executes a series of instructions corresponding to the method of networking configuration 1000 in order to determine their mode of operation. A number of wireless repeaters are also installed around the site in order to extend the range of the gateway 32. Some base units cannot connect directly to the gateway 32 and instead connect to the gateway via one of the repeaters. Several other base units 01 cannot connect to either a gateway or repeater, but can connect to another base unit acting as a unit qualified to control a local network 01 as depicted in FIG. 10. If the base unit qualified to control the local network 01 is connected to the gateway 32 or a repeater, then the additional base units connected to it 01 may access the cellular network indirectly through the qualified base unit 01. Otherwise, the local network of base units 01 may operate in an offline mode temporarily until an outside connection becomes available.

A software platform running on the server 04 collects and analyzes data from the connected base units 01 and any external sensors 23, external sensor arrays 424, or other peripherals 30 connected to any of the base units 01. The software platform performs acts 1100 or 1200 followed by act 900 to determine which types of events and/or preliminary events the system is configured to detect at the site being monitored. While performing act 900, a number of temperature sensors in a particular zone plus data from an external weather sensor array 424 indicate sub-freezing outdoor temperatures for the next several hours. Based on these readings, it is determined that a preliminary event corresponding to a potential frozen and/or bursting water pipe is in progress. Action 918 is performed, notifying necessary personnel of the potential for a pipe freezing over the next several hours, and sending a communication to one of the nearby base units 01 connected via external peripheral 30 to control a temporary heat source to raise the heat setting of the temporary heat source. Base unit 01 is further instructed to perform action 920, changing the mode of operation of several sensors including the temperature and humidity sensor to take measurements more often and transmit at a higher frequency, and turns ON PIR sensor to begin looking for detectable temperature profiles.

Several hours later, software platform running on server 04 detects that suspected event of a burst pipe (act 922) is causing an ongoing water leak upon analysis (act 912) of another base unit's 01 sensor data and despite the aforementioned efforts to prevent and/or delay the event by raising the heat. Act 914 is invoked, sending an alert to necessary personnel with details of the location, time, type, and severity of the event. Personnel may respond and fully contain the event a short duration thereafter.

Software platform running on server 04 continuously, at discrete intervals, or in response to various conditions performs methods 900, 1100, 1200, and/or 1600 and their constituent acts. Once the system detects that the event has concluded during the next cycle, the system generates a report detailing the duration, type, location, and severity of the event including the identities of those who received notifications and/or alerts.

Separate reports highlighting other parameters may be generated for other entities including insurance providers, owners, or subcontractors. Analysis of reports may provide suggestions for better deployment of detection and response measures, such the location of sensor and peripheral placement. For example, the analysis may enhance the placement of fans and/or temporary heaters for achieving more controlled heat dispersion throughout the building.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of predicting, detecting, or responding to one or more events occurring at a remote site being monitored by a local monitoring system, the method comprising:
   receiving descriptive information concerning the site being monitored including at least one of a two-dimensional floorplan of at least part of the site, a three-dimensional layout of at least part of the site, and external environmental conditions around the site;
   receiving identifying information concerning location, type, and characteristics of a plurality of sensors operating at the site;
   determining one or more plausible preliminary events that could occur at the site and that could be detected by the plurality of sensors responsive to analysis of the descriptive information and the identifying information;
   determining one or more parameter thresholds associated with each plausible preliminary event;
   receiving monitoring information collected from at least one of the plurality of sensors operating at the site, the plurality of sensors disposed in one or more base units, each base unit comprising:
   a housing; and
   one or more of the plurality of sensors disposed within the housing, each of the plurality of sensors configured to detect one or more parameters, the one or more of the plurality of sensors including a first sensor configured to measure a first parameter of the one or more parameters;
   determining whether at least one of the one or more plausible preliminary events is suspected, is in progress, or has occurred responsive to a determination that a first parameter threshold of the one or more parameter thresholds associated with the plausible preliminary event have been met or exceeded based on the monitoring information received, the first parameter threshold being associated with the first parameter;
   controlling a second sensor of the plurality of sensors to determine whether a plausible event associated with the plausible preliminary event is suspected, is in progress, or has occurred responsive to the determination that the plausible preliminary event is suspected, is in progress, or has occurred, the second sensor configured to detect a second parameter of the one or more parameters; and controlling an external device communicatively coupled to the one or more base units in response to determining that the plausible event is suspected, is in progress, or has occurred, the external device being located at the site, and the controlling of the second sensor and the external device including at least one of activating, altering an operational state of, or increasing an amount of power consumed by the second sensor and the external device.

2. The method of claim 1, wherein the first sensor is one of a volatile organic compound (VOC) sensor, a carbon monoxide (CO) sensor, a microphone, an infrared sensor, a vibration sensor, a proximity sensor, a light sensor, a smoke sensor, and a temperature sensor.

3. The method of claim 2, wherein the second sensor is a camera.

4. The method of claim 3, wherein controlling the second sensor involves activating the camera.

5. The method of claim 1, wherein the first sensor is one of a volatile organic compound (VOC) sensor, a carbon monoxide CO sensor, a microphone, an infrared sensor, a vibration sensor, a proximity sensor, a light sensor, a smoke sensor, and a temperature sensor.

6. The method of claim 5, wherein the second sensor is one of a volatile organic compound (VOC) sensor, a carbon monoxide (CO) sensor, a microphone, an infrared sensor, a vibration sensor, a proximity sensor, a light sensor, a smoke sensor, and a temperature sensor, the second sensor being configured to measure a different type of parameter than the first sensor.

7. The method of claim 1, wherein the first sensor is one of a temperature sensor, a carbon monoxide (CO) sensor, a volatile organic compound (VOC) sensor, and a smoke sensor and the second sensor is an infrared sensor.

8. The method of claim 7, wherein controlling the second sensor involves activating the infrared sensor and detecting a temperature gradient via the infrared sensor.

9. The method of claim 1, wherein the first sensor is one of a temperature sensor, a volatile organic compound (VOC) sensor, and a carbon monoxide (CO) sensor.

10. The method of claim 9, wherein the external device is one of a heater, a fan, or a heating, ventilation, or air conditioning (HVAC) unit.

11. The method of claim 10, wherein controlling the external device involves operating the external device to alter a flow of gases within the site.

12. The method of claim 1, wherein the first sensor is a one of a temperature sensor, smoke sensor, dust particulate sensor, oxygen sensor, carbon dioxide sensor, passive infrared (PIR) sensor, humidity sensor, volatile organic compound (VOC) sensor, pressure sensor, acoustic sensor, strain sensor, vibration sensor, or accelerometer sensor.

13. The method of claim 12, wherein the external device is one of a sprinkler system, a pipe valve, a pressure regulator, a pneumatic device, an environmental control system, or a pump.

14. The method of claim 13, wherein controlling the external device involves altering an operational state of the external device to control a flow of one of gas or liquid within the site.

15. The method of claim 1, wherein controlling the second sensor further includes increasing a sampling rate of the second sensor.

16. The method of claim 1, wherein in controlling the second sensor, the second sensor consumes a greater amount of power than the first sensor.

17. The method of claim 1, further comprising providing information relating to the plausible event to an external entity in response to determining that the plausible event is suspected, is in progress, or has occurred.

18. A method of predicting, detecting, or responding to one or more events occurring at a remote site being monitored by a monitoring system, the method comprising:

receiving descriptive information concerning the site being monitored including at least one of a two-dimensional floorplan of at least part of the site, a three-dimensional layout of at least part of the site, and external environmental conditions around the site;

receiving identifying information concerning location, type, and characteristics of a plurality of sensors operating at the site, the plurality of sensors including a first sensor configured to detect a first parameter and a second sensor configured to detect a second parameter;

determining one or more plausible events that could occur at the site and that could be detected by the first and second sensors responsive to analysis of the descriptive information and the identifying information;

determining at least two parameter thresholds associated with each of the one or more plausible events, the at least two parameter thresholds including a first parameter threshold associated with the first parameter and a second parameter threshold associated with the second parameter;

receiving monitoring information collected from the first sensor and the second sensor, the first and second sensors disposed within a housing of at least one base unit;

determining whether at least one of the one or more plausible events is suspected, is in progress, or has occurred responsive to a determination that the first and second parameter thresholds associated with the plausible event have been met or exceeded based on the monitoring information received;

wherein determining whether at least one of the one or more plausible events is suspected, is in progress, or has occurred includes controlling the second sensor to detect the second parameter in response to determining that the first threshold associated with the plausible event has been met or exceeded; and controlling an external device communicatively coupled to the base unit in response to determining that the plausible event is suspected, is in progress, or has occurred, the external device being located at the site.

19. The method of claim 18, wherein receiving the monitoring information collected from the first sensor includes receiving information from one of a pressure sensor, a strain sensor, an accelerometer, a vibration sensor, or a gyroscope.

20. The method of claim 19, wherein receiving the monitoring information collected from the second sensor includes receiving information from one of an accelerometer, a pressure sensor, a strain sensor, a gyroscope, or a vibration sensor, the second sensor being configured to measure a different type of parameter than the first sensor.

21. The method of claim 20, where determining whether at least one of the one or more plausible events is suspected, is in progress, or has occurred includes identifying at least one of structural foundation damage, structural failure, excessive building sway, or excessive building vibration.

22. The method of claim 18, wherein receiving the monitoring information collected from the first sensor includes receiving information from one of an ambient pressure sensor, a wind sensor, an accelerometer, a vibration sensor, a strain sensor, or a humidity sensor.

23. The method of claim 22, wherein receiving the monitoring information collected from the second sensor includes receiving information from one of an ambient pressure sensor, a wind sensor, an accelerometer, a vibration sensor, a strain sensor, or a humidity sensor, the second sensor being configured to measure a different type of parameter than the first sensor.

24. The method of claim 23, wherein determining whether at least one of the one or more plausible events is suspected, is in progress, or has occurred includes identifying a weather phenomenon.

25. The method of claim 18, wherein receiving the monitoring information collected from the first sensor includes receiving information from one of a temperature sensor, a smoke sensor, and a carbon monoxide (CO) sensor.

26. The method of claim 25, wherein receiving the monitoring information collected from the second sensor includes receiving information from one of an oxygen sensor, a humidity sensor, a smoke sensor, a dust particulate sensor, an infrared sensor, a passive infrared (PIR) sensor, a photodiode sensor, a carbon dioxide sensor, a temperature sensor, a smoke sensor, or a carbon monoxide (CO) sensor, the second sensor being configured to measure a different type of parameter than the first sensor.

27. The method of claim 26, wherein determining whether at least one of the one or more plausible events is suspected, is in progress, or has occurred includes identifying a fire.

28. The method of claim 27, further comprising providing information relating to the at least one of the one or more plausible events that is suspected, is in progress, or has occurred to an external entity.

29. The method of claim 18, wherein receiving the monitoring information collected from the first sensor includes receiving information from one of a humidity sensor, a water contact sensor, an acoustic sensor, a temperature sensor, a microphone, a passive infrared (PIR) sensor.

30. The method of claim 29, wherein receiving the monitoring information collected from the second sensor includes receiving information from one of a temperature sensor, a passive infrared (PIR) sensor, a water contact sensor, an acoustic sensor, a humidity sensor, or a microphone, the second sensor being configured to measure a different type of parameter than the first sensor.

31. The method of claim 30, wherein determining whether at least one of the one or more plausible events is suspected, is in progress, or has occurred includes identifying one of a water leak or running water.

32. The method of claim 31, further comprising providing information relating to the at least one of the one or more plausible events that is suspected, is in progress, or has occurred to an external entity via a communications module of the at least one base unit.

33. The method of claim 18, wherein receiving the monitoring information collected from the first sensor includes receiving information from a humidity sensor and receiving the monitoring information collected from the second sensor includes receiving information from one of a temperature sensor, a light sensor, an infrared sensor, a passive infrared (PIR) sensor, or an ultraviolet sensor.

34. The method of claim 33, wherein determining whether at least one of the one or more plausible events is suspected, is in progress, or has occurred includes identifying mold growth.

35. The method of claim 18, wherein receiving the monitoring information collected from the first sensor includes receiving information from one of a microphone, a carbon monoxide (CO) sensor, a camera, an accelerometer, a vibration sensor, a temperature sensor, an infrared sensor, a passive infrared (PIR) sensor, a photodiode sensor, a humidity sensor, and an acoustic sensor.

36. The method of claim 35, wherein receiving the monitoring information collected from the second sensor includes receiving information from one of a microphone, a carbon monoxide (CO) sensor, a camera, an accelerometer, a vibration sensor, a temperature sensor, an infrared sensor, a passive infrared (PIR) sensor, a photodiode sensor, an acoustic sensor, or a humidity sensor, the second sensor being configured to measure a different type of parameter than the first sensor.

37. The method of claim 36, wherein determining whether at least one of the one or more plausible events is suspected, is in progress, or has occurred includes identifying a site security breach.

38. The method of claim 37, further comprising providing information relating to the at least one of the one or more plausible events that is suspected, is in progress, or has occurred to an external entity via a communications module of the at least one base unit.

39. The method of claim 18, wherein receiving the monitoring information collected from the first sensor includes receiving information from a temperature sensor and receiving the monitoring information collected from the second sensor includes receiving information from one of a humidity sensor, a microphone, a light sensor, an ultraviolet sensor, a passive infrared (PIR) sensor, an oxygen sensor, or a carbon dioxide sensor.

40. The method of claim 39, wherein determining whether one of the one or more plausible events is suspected, is in progress, or has occurred includes identifying one of an improper seal, leak, crack, hole, or other damage to a building envelope.

41. A method of predicting, detecting, or responding to one or more events occurring at a remote site being monitored by a monitoring system, the method comprising:
receiving descriptive information concerning the site being monitored including at least one of a two-dimensional floorplan of at least part of the site, a three-dimensional layout of at least part of the site, and external environmental conditions around the site;
receiving identifying information concerning location, type, and characteristics of a plurality of sensors operating at the site, the plurality of sensors including a first sensor configured to detect a first parameter and a second sensor configured to detect a second parameter;
determining one or more plausible events that could occur at the site and that could be detected by the second sensor responsive to analysis of the descriptive information and the identifying information;
determining one or more plausible preliminary events associated with at least one of the one or more plausible events that could occur at the site and that could be detected by the first sensor responsive to analysis of the descriptive information and the identifying information;
determining at least one parameter threshold associated with each plausible preliminary event and each plausible event, the at least one parameter threshold including a first parameter threshold associated with the first parameter and the plausible preliminary event, and including a second parameter threshold associated with the second parameter and the plausible event;

receiving monitoring information collected from the first sensor and the second sensor, the first and second sensors disposed within a housing of at least one base unit;

determining whether at least one of the one or more plausible preliminary event is suspected, is in progress, or has occurred responsive to a determination that the first parameter threshold has been met or exceeded based on the monitoring information received;

updating the second parameter threshold in response to the determination that the plausible preliminary event is suspected, is in progress, or has occurred;

determining whether at least one of the one or more plausible events associated with the plausible preliminary event is suspected, is in progress, or has occurred responsive to a determination that the updated second parameter threshold has been met or exceeded based on the monitoring information received; and controlling an external device communicatively coupled to the base unit in response to determining that the plausible event is suspected, is in progress, or has occurred, the external device being located at the site.

42. The method of claim 41, further comprising, prior to updating, determining whether one of a second plausible event that requires a response inconsistent with controlling the external device or second plausible preliminary event that requires a response inconsistent with controlling the external device is suspected, is in progress, or has occurred.

43. The method of claim 42, further comprising suspending at least one of the updating or the controlling in response to determining that the one of the second plausible event or the second plausible preliminary event is suspected, is in progress, or has occurred.

44. The method of claim 41, wherein receiving the monitoring information collected from either the first or the second sensor includes receiving information from one of a pressure sensor, a strain sensor, an accelerometer, a vibration sensor, or a gyroscope.

45. The method of claim 44, wherein receiving the monitoring information collected from the other of the first or second sensor includes receiving information from one of an accelerometer, a pressure sensor, a strain sensor, a gyroscope, or a vibration sensor, the second sensor being configured to measure a different type of parameter than the first sensor.

46. The method of claim 45, wherein determining whether at least one of the one or more plausible events is suspected, is in progress, or has occurred includes identifying at least one of structural foundation damage, structural failure, excessive building sway, or excessive building vibration.

47. The method of claim 41, wherein receiving the monitoring information collected from either the first or the second sensor includes receiving information from one of an ambient pressure sensor, a wind sensor, an accelerometer, a vibration sensor, a strain sensor, or a humidity sensor.

48. The method of claim 47, wherein receiving the monitoring information collected from the other of the first or second sensor includes receiving information from one of an ambient pressure sensor, a wind sensor, an accelerometer, a vibration sensor, a strain sensor, or a humidity sensor, the second sensor being configured to measure a different type of parameter than the first sensor.

49. The method of claim 48, wherein determining whether at least one of the one or more plausible events is suspected, is in progress, or has occurred includes identifying a weather phenomenon.

50. The method of claim 49, wherein receiving the monitoring information collected from either the first sensor or the second includes receiving information from one of a temperature sensor, a smoke sensor, and a carbon monoxide (CO) sensor.

51. The method of claim 50, wherein receiving the monitoring information collected from the other of the first or second sensor includes receiving information from one of an oxygen sensor, a humidity sensor, a smoke sensor, a dust particulate sensor, an infrared sensor, a passive infrared (PIR) sensor, a photodiode sensor, a carbon dioxide sensor, a temperature sensor, a smoke sensor, or a carbon monoxide (CO) sensor, the second sensor being configured to measure a different type of parameter than the first sensor.

52. The method of claim 51, wherein determining whether at least one of the one or more plausible events is suspected, is in progress, or has occurred includes identifying a fire.

53. The method of claim 52, further comprising providing information relating to the at least one of the one or more plausible events that is suspected, is in progress, or has occurred to an external entity.

54. The method of claim 41, wherein receiving the monitoring information collected from either the first sensor or the second sensor includes receiving information from one of a humidity sensor, a water contact sensor, an acoustic sensor, a temperature sensor, a microphone, a passive infrared (PIR) sensor.

55. The method of claim 54, wherein receiving the monitoring information collected from the other of the first or second sensor includes receiving information from one of a temperature sensor, a passive infrared (PIR) sensor, a water contact sensor, an acoustic sensor, a humidity sensor, or a microphone, the second sensor being configured to measure a different type of parameter than the first sensor.

56. The method of claim 55, wherein determining whether at least one of the one or more plausible events is suspected, is in progress, or has occurred includes identifying one of a water leak or running water.

57. The method of claim 56, further comprising providing information relating to the at least one of the one or more plausible events that is suspected, is in progress, or has occurred to an external entity via a communications module of the at least one base unit.

58. The method of claim 41, wherein receiving the monitoring information collected from either the first sensor or the second sensor includes receiving information from a humidity sensor and receiving the monitoring information collected from the other of the first or second sensor includes receiving information from one of a temperature sensor, a light sensor, an infrared sensor, a passive infrared sensor, or an ultraviolet sensor.

59. The method of claim 58, wherein determining whether at least one of the one or more plausible events is suspected, is in progress, or has occurred includes identifying mold growth.

60. The method of claim 41, wherein receiving the monitoring information collected from either the first sensor or the second sensor includes receiving information from one of a microphone, a carbon monoxide (CO) sensor, a camera, an accelerometer, a vibration sensor, a temperature sensor, an infrared sensor, a passive infrared (PIR) sensor, a photodiode sensor, a humidity sensor, and an acoustic sensor.

61. The method of claim 60, wherein receiving the monitoring information collected from the other of the first or second sensor includes receiving information from one of a microphone, a carbon monoxide (CO) sensor, a camera, an accelerometer, a vibration sensor, a temperature sensor, an infrared sensor, a passive infrared (PIR) sensor, a photodiode sensor, an acoustic sensor, or a humidity sensor, the second sensor being configured to measure a different type of parameter than the first sensor.

62. The method of claim 61, wherein determining whether at least one of the one or more plausible events is suspected, is in progress, or has occurred includes identifying a site security breach.

63. The method of claim 62, further comprising providing information relating to the at least one of the one or more plausible events that is suspected, is in progress, or has occurred to an external entity via a communications module of the at least one base unit.

64. The method of claim 41, wherein receiving the monitoring information collected from either the first sensor or the second sensor includes receiving information from a temperature sensor and receiving the monitoring information collected from the other of the first or second sensor includes receiving information from one of a humidity sensor, a microphone, a light sensor, an ultraviolet sensor, a passive infrared (PIR) sensor, an oxygen sensor, or a carbon dioxide sensor.

65. The method of claim 64, wherein determining whether one of the one or more plausible events is suspected, is in progress, or has occurred includes identifying one of an improper seal, leak, crack, hole, or other damage to a building envelope.

66. The method of claim 41, wherein receiving the monitoring information collected from the second sensor is performed in response to determining that the first parameter threshold associated with the first parameter has been met or exceeded.

67. The method of claim 41, wherein either the first sensor or the second sensor is one of a volatile organic compound (VOC) sensor, a carbon monoxide (CO) sensor, a microphone, an infrared sensor, a vibration sensor, a proximity sensor, a light sensor, a smoke sensor, and a temperature sensor, and the other of the first or second sensor is a camera.

68. The method of claim 41, wherein controlling the external device involves activating a camera.

69. The method of claim 41, wherein either the first sensor or the second sensor is one of a volatile organic compound (VOC) sensor, a carbon monoxide CO sensor, a microphone, an infrared sensor, a vibration sensor, a proximity sensor, a light sensor, a smoke sensor, and a temperature sensor.

70. The method of claim 69, wherein the other of the first or second sensor is one of a volatile organic compound (VOC) sensor, a carbon monoxide (CO) sensor, a microphone, an infrared sensor, a vibration sensor, a proximity sensor, a light sensor, a smoke sensor, and a temperature sensor, the second sensor being configured to measure a different type of parameter than the first sensor.

71. The method of claim 41, wherein either the first sensor or the second sensor is one of a temperature sensor, a carbon monoxide (CO) sensor, a volatile organic compound (VOC) sensor, and a smoke sensor and the other of the first or second sensor is an infrared sensor.

72. The method of claim 71, further comprising activating the infrared sensor and detecting a temperature gradient via the infrared sensor.

73. The method of claim 41, wherein either the first sensor or the second sensor is one of a temperature sensor, a volatile organic compound (VOC) sensor, and a carbon monoxide (CO) sensor.

74. The method of claim 73, wherein the external device is one of a heater, a fan, or a heating, ventilation, or air conditioning (HVAC) unit.

75. The method of claim 74, wherein controlling the external device involves operating the external device to alter a flow of gases within the site.

76. The method of claim 41, wherein either the first sensor or the second sensor is a one of a temperature sensor, smoke sensor, dust particulate sensor, oxygen sensor, carbon dioxide sensor, passive infrared (PIR) sensor, humidity sensor, volatile organic compound (VOC) sensor, pressure sensor, acoustic sensor, strain sensor, vibration sensor, or accelerometer sensor.

77. The method of claim 76, wherein the external device is one of a sprinkler system, a pipe valve, a pressure regulator, a pneumatic device, an environmental control system, or a pump.

78. The method of claim 77, wherein controlling the external device involves altering an operational state of the external device to control a flow of one of gas or liquid within the site.

79. The method of claim 41, further comprising increasing a sampling rate of the first sensor, the second sensor, or the external device in response to the determination that the plausible preliminary event is suspected, is in progress, or has occurred.

80. The method of claim 41, further comprising increasing an amount of power consumption of the first sensor, the second sensor, or the external device in response to the determination that the plausible preliminary event is suspected, is in progress, or has occurred.

* * * * *